US012147224B2

(12) United States Patent
Casa

(10) Patent No.: US 12,147,224 B2
(45) Date of Patent: Nov. 19, 2024

(54) SYSTEMS AND METHODS FOR ARTIFICIAL INTELLIGENCE-BASED MAINTENANCE OF AN AIR CONDITIONING SYSTEM

(71) Applicant: Alisea S.r.l., Mezzanino (IT)

(72) Inventor: Andrea Casa, Borgarello (IT)

(73) Assignee: Alisea S.r.l., Mezzanino (IT)

(*) Notice: Subject to any disclaimer, the term of this patent is extended or adjusted under 35 U.S.C. 154(b) by 140 days.

(21) Appl. No.: 17/505,790

(22) Filed: Oct. 20, 2021

(65) Prior Publication Data
US 2022/0035361 A1    Feb. 3, 2022

Related U.S. Application Data

(63) Continuation of application No. 16/672,651, filed on Nov. 4, 2019, now Pat. No. 11,156,997.

(30) Foreign Application Priority Data

Sep. 9, 2019    (EP) ..................................... 19425063

(51) Int. Cl.
*F24F 11/62*    (2018.01)
*F24F 11/39*    (2018.01)
(Continued)

(52) U.S. Cl.
CPC .......... *G05B 23/0283* (2013.01); *F24F 11/39* (2018.01); *F24F 11/52* (2018.01);
(Continued)

(58) Field of Classification Search
CPC .......... F24F 13/105; F24F 11/62; F24F 11/39; F24F 11/52; G06T 7/246; G06T 17/00;
(Continued)

(56) References Cited

U.S. PATENT DOCUMENTS 4,948,040 A    8/1990  Kobayashi et al.
11,016,129 B1*  5/2021  Epard ................ G01R 19/2513
(Continued)

FOREIGN PATENT DOCUMENTS

CN    106989489 A    7/2017
CN    107504634 A    12/2017
(Continued)

OTHER PUBLICATIONS

Liu et al, CN 209101413, "A Power-free Hot-pipe-Type Air Conditioning System" (translation), Jul. 12, 2019, 12 pgs <CN_209101413.pdf>.*
(Continued)

*Primary Examiner* — Tuan A Vu
(74) *Attorney, Agent, or Firm* — Jones Day

(57) ABSTRACT

Systems and methods are provided for maintaining an air conditioning system. A system can include one or more sensors positioned inside of the air conditioning system configured to transmit current sensor data to a remote location. A data repository contains historic sensor data and corresponding air conditioning system status data. A neural network is trained using the historic sensor data and the corresponding air conditioning system status data to predict a future air conditioning system status based on the transmitted current sensor data. A server computer system is configured to predict the future air conditioning system status based on the current sensor data using the neural network, and a graphical user interface is configured to display the predicted future air conditioning system status to a remote client. The current sensor data is stored in the data repository and the neural network is further trained based on the current sensor data.

29 Claims, 39 Drawing Sheets

(51) Int. Cl.
*F24F 11/52* (2018.01)
*G05B 23/02* (2006.01)
*G06N 3/08* (2023.01)
*H04L 12/28* (2006.01)
*F24F 110/64* (2018.01)
*F24F 120/00* (2018.01)
*G06N 3/088* (2023.01)
*G06T 17/00* (2006.01)
*H02J 13/00* (2006.01)

(52) U.S. Cl.
CPC ............... *F24F 11/62* (2018.01); *G06N 3/08* (2013.01); *H04L 12/2825* (2013.01); *F24F 2110/64* (2018.01); *F24F 2120/00* (2018.01); *G06N 3/088* (2013.01); *G06T 17/00* (2013.01); *H02J 13/00017* (2020.01)

(58) Field of Classification Search
CPC ...... G06N 3/08; H04N 1/484; H04N 1/00737; H04N 23/56; B64D 47/08; G06Q 50/163; G01R 19/2513; G01B 11/02; G05D 23/1917; G05B 23/0283; G03B 21/2053
See application file for complete search history.

(56) References Cited

U.S. PATENT DOCUMENTS

| | | | |
|---|---|---|---|
| 11,055,797 B1* | 7/2021 | Carone | G06Q 50/163 |
| 2005/0219363 A1* | 10/2005 | Kohler | H04N 1/484 |
| | | | 348/188 |
| 2006/0032379 A1* | 2/2006 | Kates | G05D 23/1917 |
| | | | 96/417 |
| 2008/0281528 A1 | 11/2008 | Relle, Jr. | |
| 2014/0072211 A1* | 3/2014 | Kovesi | G06T 7/246 |
| | | | 382/164 |
| 2014/0217185 A1 | 8/2014 | Bicknell | |
| 2014/0300722 A1* | 10/2014 | Garcia | G01B 11/02 |
| | | | 348/135 |
| 2017/0148184 A1* | 5/2017 | Kraus | G06T 17/00 |
| 2017/0176030 A1* | 6/2017 | Emmons | F24F 11/62 |
| 2017/0213334 A1* | 7/2017 | Ducharme | H04N 23/56 |
| 2018/0012479 A1 | 1/2018 | Seaton et al. | |
| 2018/0073873 A1* | 3/2018 | Takao | G03B 21/2053 |
| 2018/0318746 A1 | 11/2018 | Tithosh | |
| 2019/0005165 A1 | 1/2019 | Meagher et al. | |
| 2019/0107307 A1* | 4/2019 | Kring | F24F 13/105 |
| 2019/0215410 A1* | 7/2019 | D'Armancourt | H04N 1/00737 |
| 2019/0291884 A1* | 9/2019 | Mackin | B64D 47/08 |
| 2019/0339687 A1 | 11/2019 | Cella et al. | |
| 2019/0346417 A1 | 11/2019 | Benefield | |
| 2021/0003308 A1 | 1/2021 | Venne | |

FOREIGN PATENT DOCUMENTS

| | | |
|---|---|---|
| CN | 10766744 A | 1/2018 |
| CN | 107679649 A | 2/2018 |
| CN | 108253587 A | 7/2018 |
| CN | 108592352 A | 9/2018 |
| CN | 110057045 A | 7/2019 |
| CN | 110210579 A | 9/2019 |
| EP | 3002653 A1 | 4/2016 |
| JP | 195958 A | 7/2002 |
| WO | 097613 A1 | 5/2019 |

OTHER PUBLICATIONS

KR 101078474, (translation), Oct. 31, 2011, 18 pgs <KR_101078474.pdf>.*
JP 5912085, (translation), Apr. 27, 2016, 11 pgs <JP_5912085.pdf>.*
Partial European Search Report, European Application No. EP19425063, dated Mar. 12, 2020.
European Search Report, European Application No. EP19425063, dated Jun. 22, 2020.

* cited by examiner

STAND REMOTAIR - BRANCH MAP
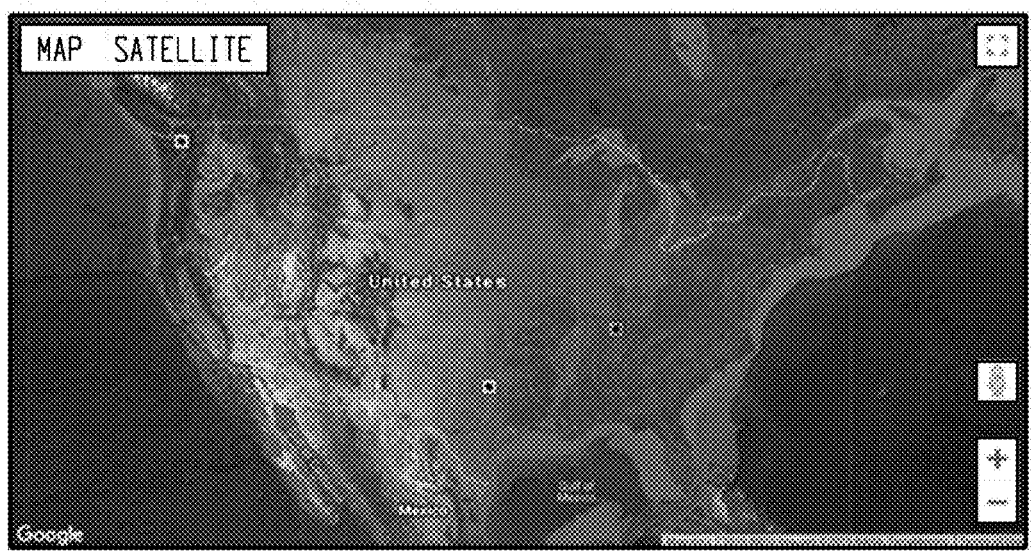
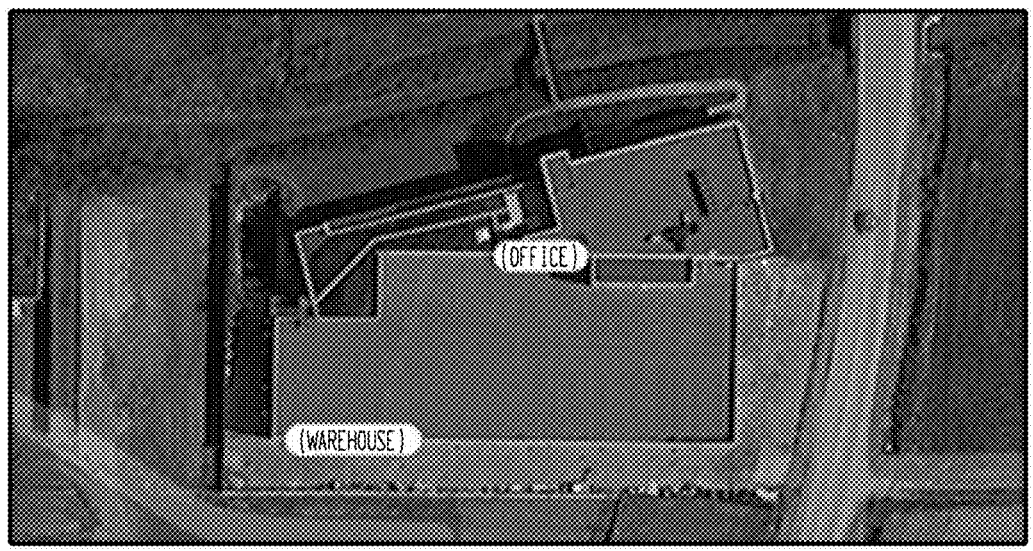
| SECTOR OFFICE | | | | | |
|---|---|---|---|---|---|
| PLANT | DEPARTMENT | EVALUATED PARAMETERS | COMPLIANT PARAMETERS | NON-COMPLIANT PARAMETERS | MALFUNCTIONING PARAMETERS |
| DEMO PLANT | OFFICE FLOOR 1 | 8/8 | 5/8 | 3/8 | 0/8 |
| MY STAND AREA | MUSIC CENTER | 1/8 | 1/8 | 0/8 | 0/8 |
| OFFICE TEST AREA | OFFICE FLOOR 2 | 2/8 | 2/8 | 0/8 | 0/8 |
*Fig. 3*

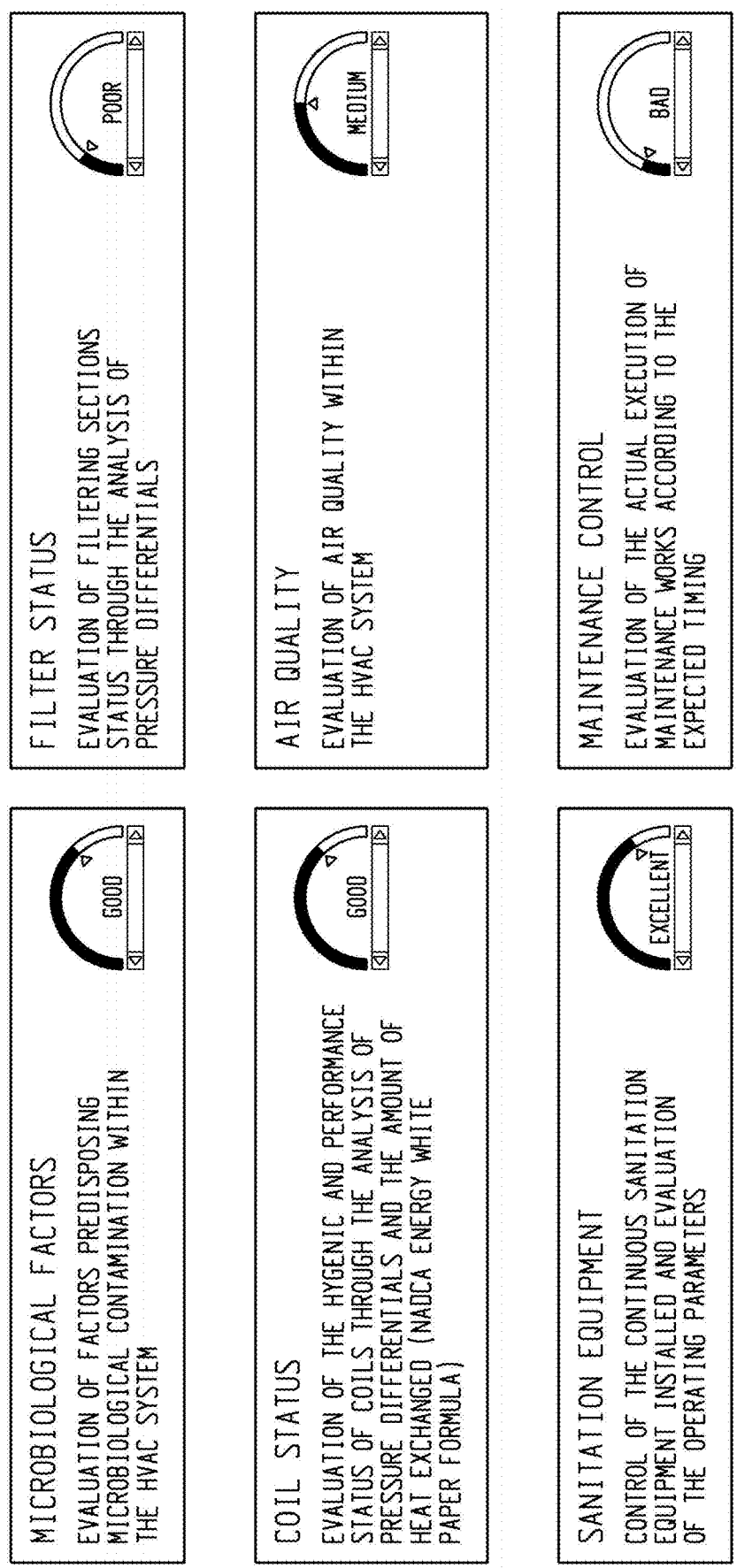
Fig. 4, cont.

CAMERA - DRAIN PAN
LAST VALUE RECORDED IN MARCH 26, 2019, 6 p.m:
0.16 g/m$^2$
☑ REQUIRED ACTION: CONTINUE SURVEILLIANCE
☑ PREDICTIVE ANALYSIS: WITHOUT ACTION THE SYSTEM WILL GET TO BAD STATUS IN 400 DAYS.

CAMERA - FAN
LAST VALUE RECORDED IN:
OPTICAL ANALYSIS SENSOR NOT INSTALLED
☑ REQUIRED ACTION: N/A
☑ PREDICTIVE ANALYSIS: WITHOUT ACTION THE SYSTEM WILL GET TO BAD STATUS IN N/A DAYS.

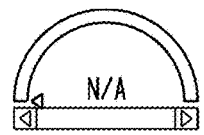

CAMERA - PRE-FILTER
LAST VALUE RECORDED IN MARCH 26, 2019, 2 p.m:
0.16 g/m$^2$
☑ REQUIRED ACTION: CONTINUE SURVEILLIANCE
☑ PREDICTIVE ANALYSIS: WITHOUT ACTION THE SYSTEM WILL GET TO BAD STATUS IN 300 DAYS.

*Fig. 8*

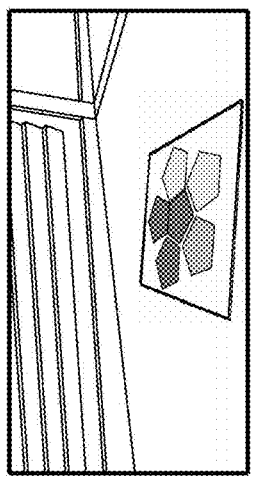
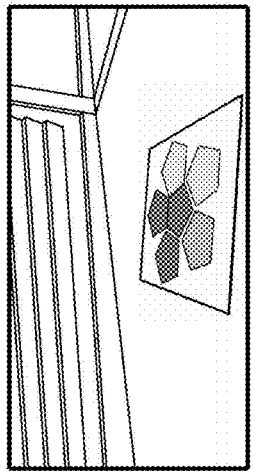
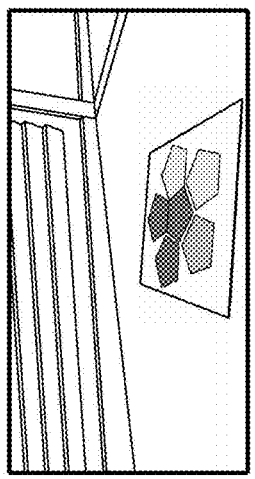
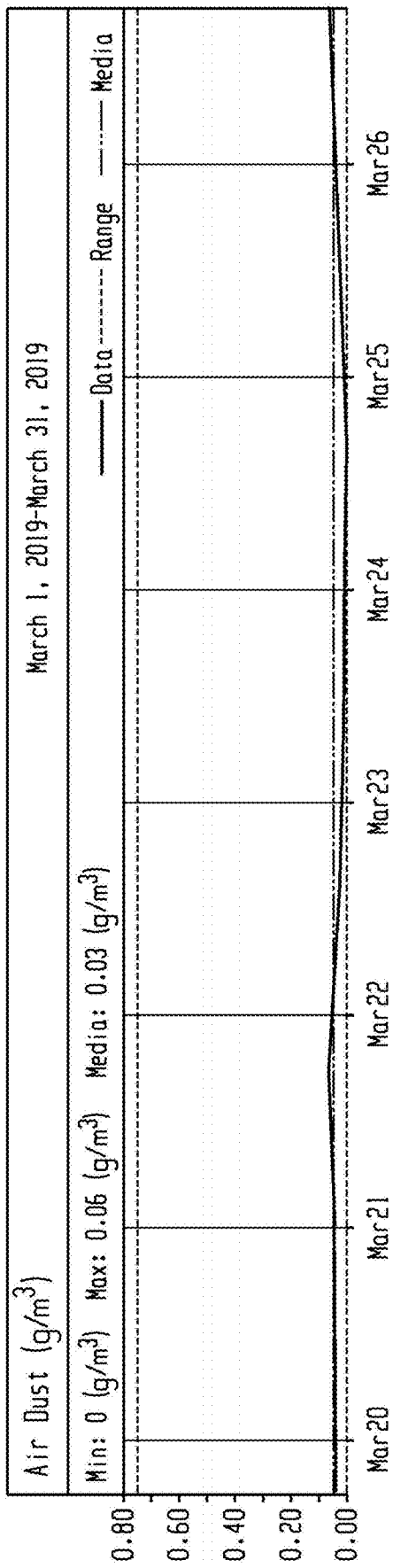
Fig. 9

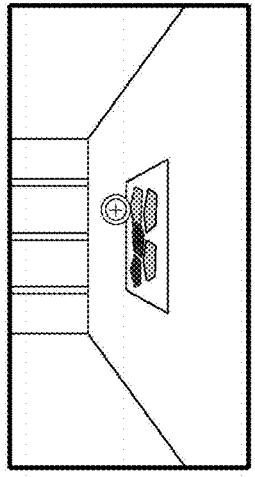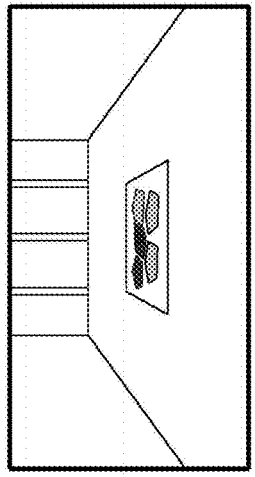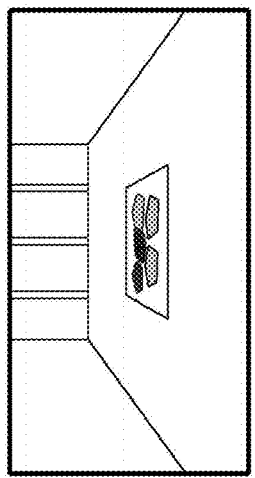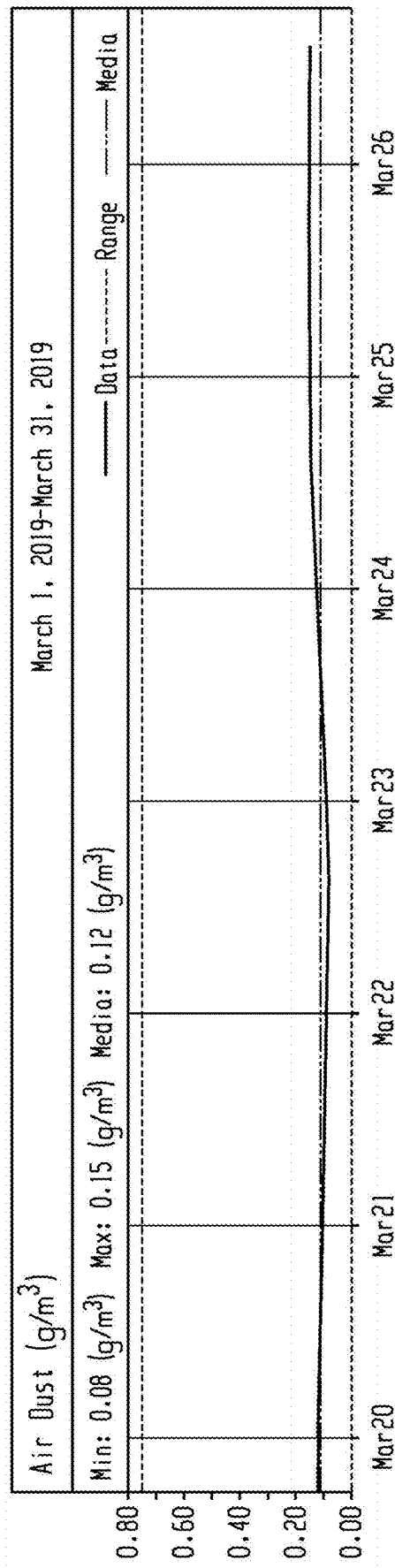
Fig. 9, cont.

PRE-FILTER
LAST VALUE RECORDED:
AIR DUST: 0.16 g/m$^2$
HUMIDITY: 18.50%
TEMPERATURE: 25.90°C
☑ REQUIRED ACTION: CONTINUE SURVEILLIANCE
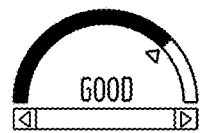

DRAIN PAN
LAST VALUE RECORDED:
AIR DUST: 0.06 g/m$^2$
HUMIDITY: 23.82%
TEMPERATURE: 20.82°C
☑ REQUIRED ACTION: CONTINUE SURVEILLIANCE

ZONE 1 - SUPPLY
LAST VALUE RECORDED:
AIR DUST: 0.14 g/m$^2$
HUMIDITY: 21.63%
TEMPERATURE: 18.90°C
☑ REQUIRED ACTION: CONTINUE SURVEILLIANCE
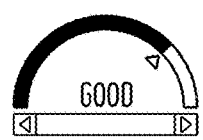

ZONE 1 - SUPPLY TEST
LAST VALUE RECORDED:
AIR DUST: 0.07 g/m$^2$
HUMIDITY: 33.13%
TEMPERATURE: 14.88°C
☑ REQUIRED ACTION: CONTINUE SURVEILLIANCE

ZONE 2 - SUPPLY
LAST VALUE RECORDED:
AIR DUST: 0.02 g/m$^2$
HUMIDITY: 15.00%
TEMPERATURE: 25.64°C
☑ REQUIRED ACTION: CONTINUE SURVEILLIANCE

*Fig. 13*

DIFFERENTIAL PRESSURE - AHU FILTER 1
LAST VALUE RECORDED IN MARCH 14, 2019, 5:20 p.m.
59.15 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 100 DAYS

DIFFERENTIAL PRESSURE - AHU FILTER 2
LAST VALUE RECORDED IN MARCH 14, 2019, 5:20 p.m.
101.20 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 100 DAYS

DIFFERENTIAL PRESSURE - AHU FILTER 3
LAST VALUE RECORDED IN MARCH 14, 2019, 5:20 p.m.
694.50 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 30 DAYS

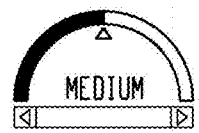

DIFFERENTIAL PRESSURE - HEPA FILTER 1
LAST VALUE RECORDED IN MARCH 2, 2019, 9:07 p.m.
0.00 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 0 DAYS

DIFFERENTIAL PRESSURE - HEPA FILTER 2
LAST VALUE RECORDED IN MARCH 2, 2019, 9:08 p.m.
0.00 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 0 DAYS

DIFFERENTIAL PRESSURE - HEPA FILTER 3
LAST VALUE RECORDED IN MARCH 2, 2019, 9:08 p.m.
0.00 PASCAL
☑ REQUIRED ACTION: CONTINUE SURVEILLANCE
☑ PREDICTIVE ANALYSIS: WITHOUT ACTION YOU WILL HAVE TO REPLACE THE FILTER IN 0 DAYS

DIFFERENTIAL PRESSURE - AHU COIL 1
LAST VALUE RECORDED IN MARCH 14, 2019, 5:20 p.m.:
15.65 PASCAL

☑ REQUIRED ACTION: CONTINUE SURVEILLIANCE
☑ PREDICTIVE ANALYSIS: WITHOUT ACTION YOU WILL
  HAVE TO CLEAN THE COIL IN 150 DAYS.

HEAT EXCHANGE - AHU COIL 1
LAST VALUE RECORDED IN MARCH 14, 2019, 5:28 p.m.:
22755.60 BTU/h

☑ REQUIRED ACTION: CONTINUE SURVEILLIANCE
☑ PREDICTIVE ANALYSIS: WITHOUT ACTION YOU WILL
  HAVE TO CLEAN THE COIL IN 200 DAYS.

VALUE RECORDED BEFORE CLEANING IN MARCH 12, 2019, 2:15 p.m.:
17517.54 BTU/h

PERFORMANCE IMPROVEMENT: +23%

*Fig. 21*

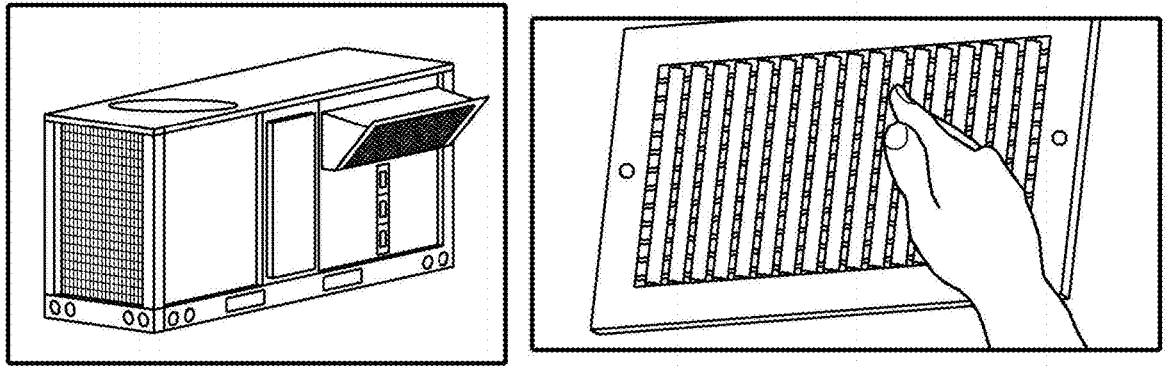
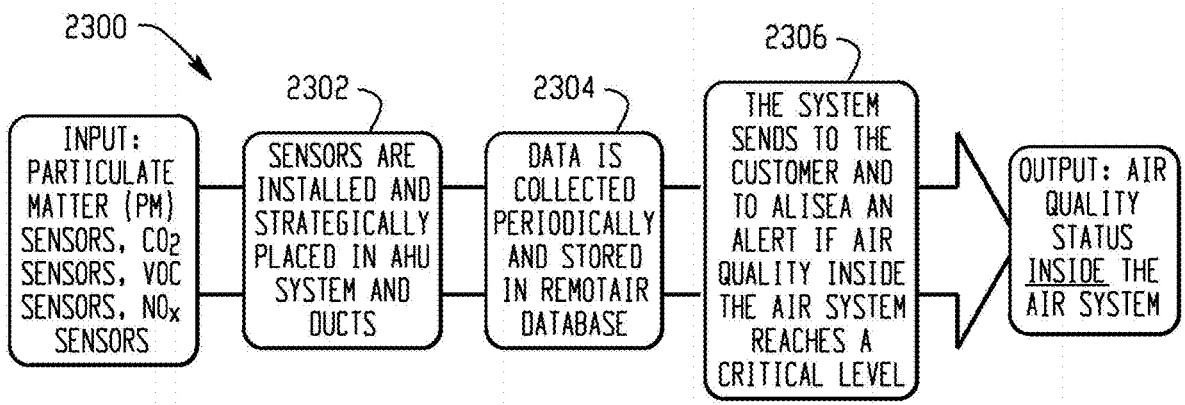
| | |
|---|---|
| PM$_1$ | PARTICULATE MATTER < 1 μm |
| PM$_{2.5}$ | PARTICULATE MATTER < 2.5 μm |
| PM$_4$ | PARTICULATE MATTER < 4 μm |
| PM$_{10}$ | PARTICULATE MATTER < 10 μm |
| | |
|---|---|
| NC$_1$ | NUMBER OF PARTICLES < 1 μm |
| NC$_{2.5}$ | NUMBER OF PARTICLES < 2.5 μm |
| NC$_4$ | NUMBER OF PARTICLES < 4 μm |
| NC$_{10}$ | NUMBER OF PARTICLES < 10 μm |
Fig. 23

PM2.5 - ZONE 1 - SUPPLY
LAST VALUE RECORDED IN MARCH 14, 2019, 3:11 p.m.:
21.14 µg/m³
☑ CORRECTIVE ACTION: CONTINUE SURVEILLANCE OF AIR FILTER STATUS

PM10.0 - ZONE 1 - SUPPLY
LAST VALUE RECORDED IN MARCH 14, 2019, 3:11 p.m.:
14.40 µg/m³
☑ CORRECTIVE ACTION: CONTINUE SURVEILLANCE OF AIR FILTER STATUS

PM1.0 - ZONE 1 - SUPPLY
LAST VALUE RECORDED IN MARCH 14, 2019, 3:11 p.m.:
15.60 µg/m³
☑ CORRECTIVE ACTION: CONTINUE SURVEILLANCE OF AIR FILTER STATUS
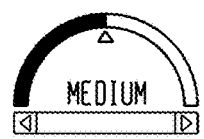

PM4.0 - ZONE 1 - SUPPLY
LAST VALUE RECORDED IN MARCH 14, 2019, 3:11 p.m.:
14.35 µg/m³
☑ CORRECTIVE ACTION: CONTINUE SURVEILLANCE OF AIR FILTER STATUS

CO2 - ZONE 2 - RETURN
LAST VALUE RECORDED IN MARCH 14, 2019, 5:28 p.m.:
580.08 ppm
☑ CORRECTIVE ACTION: CONTINUE SURVEILLANCE OF AIR RETURN RATIO

CO2 - ZONE 2 - SUPPLY
LAST VALUE RECORDED IN MARCH 14, 2019, 5:20 p.m.:
413.20 ppm
☑ CORRECTIVE ACTION: CONTINUE SURVEILLANCE OF AIR RETURN RATIO

Fig. 25

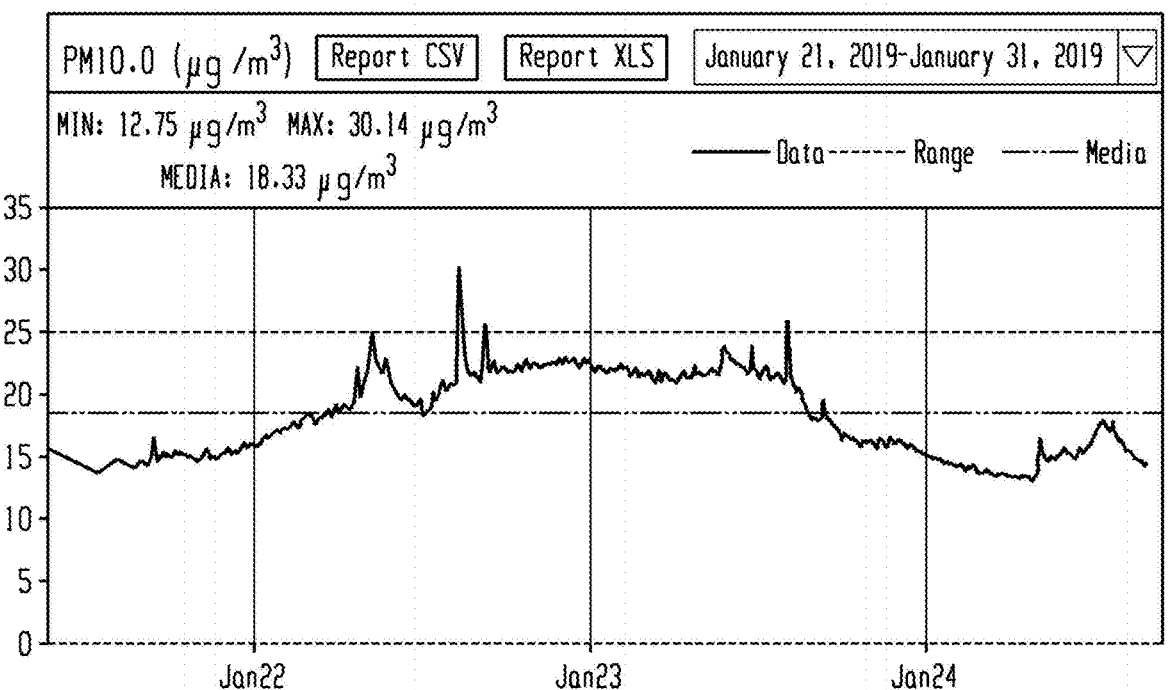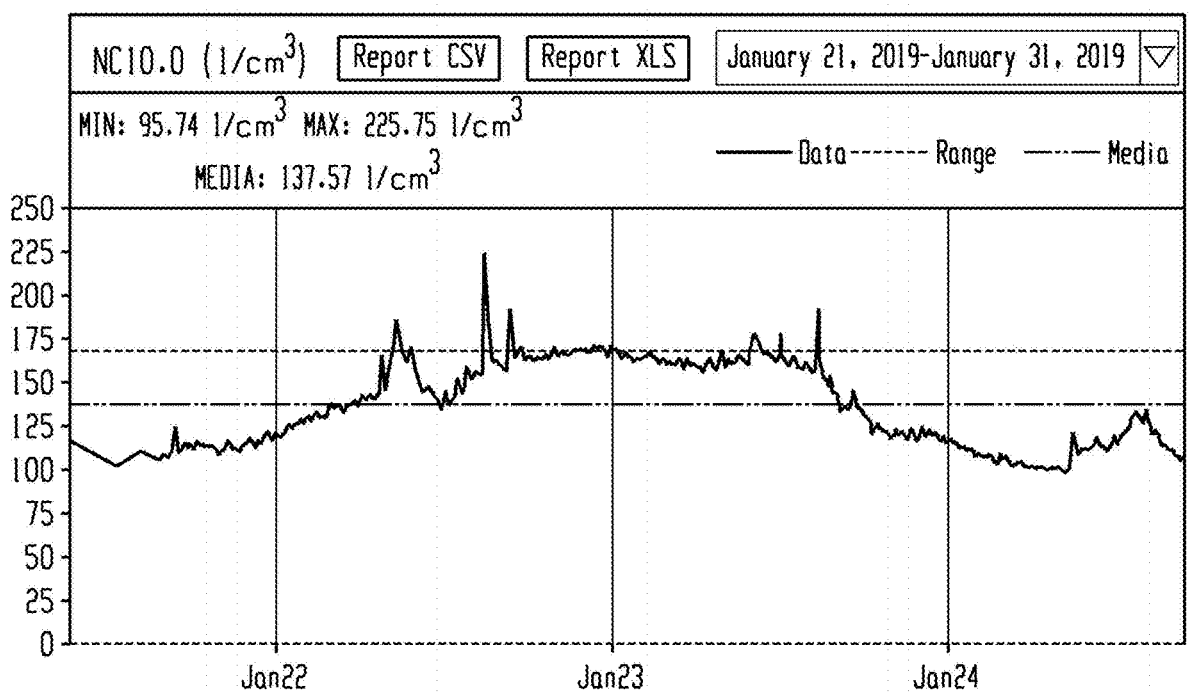
Fig. 27

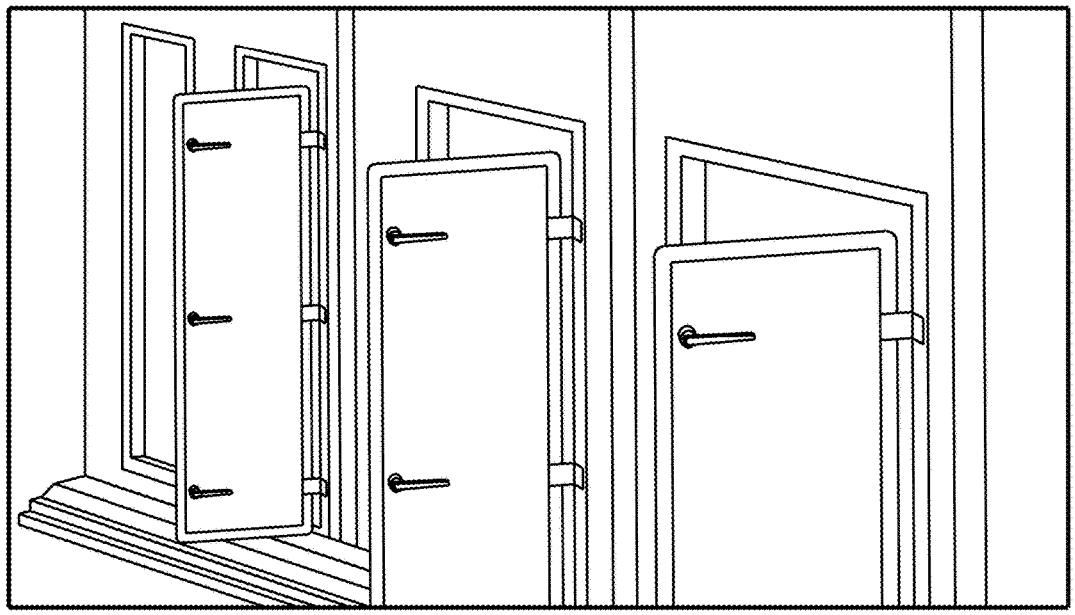
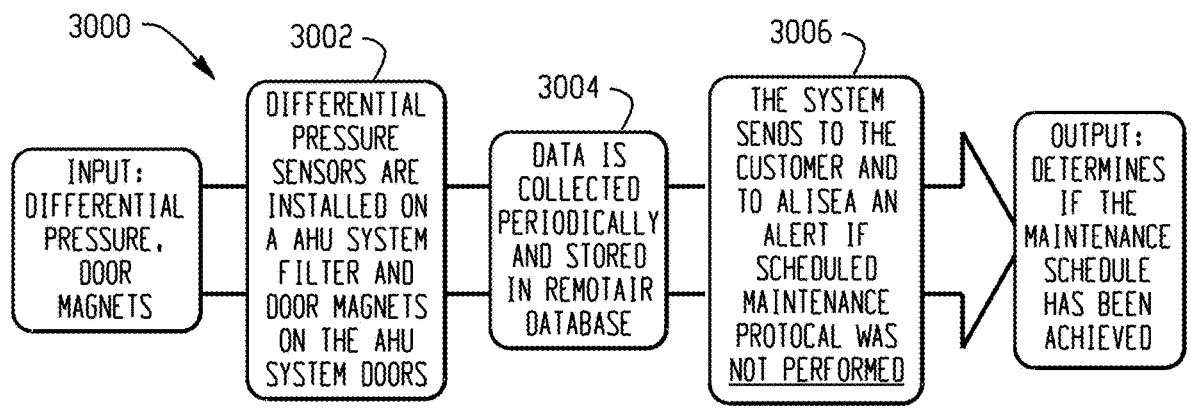
Fig. 30

| Manutenzione 2019 | | | | | | | | | | | | |
|---|---|---|---|---|---|---|---|---|---|---|---|---|
| Tipo Manutenzione | Apparato ∨ | Gennaio | Febbraio | Marzo | Aprile | Maggio | Giugno | Luglio | Agosto | Settembre | Ottobre | Novembre |
| Sostituzione Filtro | Filter J2 | ● | ▲ | ◆ | | | | ○ | | | | ○ |
| Sostituzione Cinghie | HVAC 1 | ▲ | ● | | | | | ○ | | | | |

| Maintenance 2019 | | | | | | | | | | | | |
|---|---|---|---|---|---|---|---|---|---|---|---|---|
| Type ∨ | Device | Jan | Feb | Mar | Apr | May | Jun | Jul | Aug | Sep | Oct | Nov | Dec |
| Cleaning | Duct | | | ● | | | | | | | | | |
| Cleaning | AHU | | | | ▲ | | | | | | | | |
| Change Filter | Filter 2 | | ▲ | | | ● | | | ○ | | | | |
| Change Filter | Filter 1 | ● | | | | | ▲ | | | | | ○ | |
| Change Filter | Filter 3 | | | | | | ● | | | | ○ | | |

● : Done
▲ : Not Done
◆ : Scheduled for the current month
○ : Scheduled in the coming months

*Fig. 31*

SYSTEMS AND METHODS FOR ARTIFICIAL INTELLIGENCE-BASED MAINTENANCE OF AN AIR CONDITIONING SYSTEM

CROSS-REFERENCE TO RELATED APPLICATIONS

This application is a continuation application of U.S. patent application Ser. No. 16/672,651, filed Nov. 4, 2019, which claims priority to European Application No. 19425063.5, filed on Sep. 9, 2019, both of which are incorporated herein by reference in their entireties.

TECHNICAL FIELD

The technology described herein relates to automated maintenance of an air conditioning system and more particularly to use of artificial intelligence to provide predictive maintenance of an air conditioning system.

BACKGROUND

Air conditioning systems are typically inspected periodically (e.g., yearly) to determine their operating status. During those periodic visits, the status of components and general impressions regarding the presence of operating issues, such as deterioration of parts, excessive dust buildup, may be noted. Some remediation (e.g., replacement of parts, cleaning of ducts) may be performed at the time of inspection. But otherwise, the air conditioning system (e.g., a heating system, an air conditioning system, a heating, ventilation, and air conditioning (HVAC) system) typically operates with its current status unknown between inspections. When an issue does occur, such as an anomaly that results in an air conditioning system outage, it may take time for maintenance to be performed. Air conditioning system outages can be costly both in terms of lost enjoyment of the air conditioned space during the outage as well as damage to products and occupants that might be spoiled, injured, or otherwise harmed during the air conditioning outage.

Systems and methods as described herein can provide continuous, real-time monitoring of an air conditioning system as well as AI-powered predictive analysis of future air conditioning system status to provide for proactive maintenance to limit or eliminate the disruptions caused by air conditioning system outages.

SUMMARY

Systems and methods are provided for maintaining an air conditioning system. A system can include one or more sensors positioned inside of the air conditioning system configured to transmit current sensor data to a remote location. A data repository contains historic sensor data and corresponding air conditioning system status data. A neural network is trained using the historic sensor data and the corresponding air conditioning system status data to predict a future air conditioning system status based on the transmitted current sensor data. A server computer system is configured to predict the future air conditioning system status based on the current sensor data using the neural network, and a graphical user interface is configured to display the predicted future air conditioning system status to a remote client. The current sensor data is stored in the data repository and the neural network is further trained based on the current sensor data.

As another example, a method for maintaining an air conditioning system includes capturing image data inside of the air conditioning system and transmitting the image data to a remote location outside of the air conditioning system. The image data is processed at the remote location to determine an image delta value, wherein the image delta value represents a change in the image data over a period of time. The image delta value is compared to a threshold value, wherein the threshold value is set based on an evaluation of historic image delta values and corresponding air conditioning system status values or based on a standards setting body. An alert signal is transmitted over a computer network when the image delta value exceeds the threshold value.

As another example, a computer-implemented system for maintaining an air conditioning system includes one or more data processors and a non-transitory computer-readable medium encoded with instructions for commanding one or more data processors to execute a method that includes capturing image data inside of the air conditioning system and transmitting the image data to a remote location outside of the air conditioning system. The image data is processed at the remote location to determine an image delta value, wherein the image delta value represents a change in the image data over a period of time. The image delta value is compared to a threshold value, wherein the threshold value is set based on an evaluation of historic image delta values and corresponding air conditioning system status values. An alert signal is transmitted over a computer network when the image delta value exceeds the threshold value.

As a further example, a computer-readable medium is encoded with instructions for commanding one or more data processors to execute a method that includes capturing image data inside of the air conditioning system and transmitting the image data to a remote location outside of the air conditioning system. The image data is processed at the remote location to determine an image delta value, wherein the image delta value represents a change in the image data over a period of time. The image delta value is compared to a threshold value, wherein the threshold value is set based on an evaluation of historic image delta values and corresponding air conditioning system status values. An alert signal is transmitted over a computer network when the image delta value exceeds the threshold value.

BRIEF DESCRIPTION OF THE FIGURES

FIG. 3 depicts a user interface for navigating to data associated with a particular AC system of interface.

FIG. 8 is a diagram depicting example cleanliness status and predictive information displayed on a user interface.

FIG. 9 is a diagram depicting example captured images, estimated dust contamination values based on those captured images, and graphs depicting contamination levels over a period of time.

FIG. 13 depicts microbiological contamination assessments at different points in an AC system.

FIG. 21 depicts an example user interface for providing data and predictions regarding coil status and performance

FIG. 23 is a flow diagram depicting a method of measuring air quality and making corresponding predictions inside of an AC system.

FIG. 25 depicts a user interface providing indications of air quality at various points within an AC system.

FIG. 27 depicts example particulate weight and count data captured and stored over a period of time.

FIG. 30 is a flow diagram depicting an example method of detecting access to an AC system.

FIG. 31 depicts example user interfaces whereby automated maintenance detection is tracked against a maintenance schedule.

DETAILED DESCRIPTION

Systems and methods as described herein provide for continuous monitoring and collection of data associated with an appliance, such as an air conditioning system. That data may be used to provide user interfaces (e.g., via a computer system connected to a computer network) that identify the current status of the air conditioning system. Artificial intelligence may, in certain embodiments, be configured to analyze the captured system data to provide predictions on future behavior of the air conditioning system. For example, the artificial intelligence, trained based on historic air conditioning system metrics and occurrences, may be able to predict when certain components of the air conditioning system (e.g., a filter, a coil) are predicted to fail or experience a performance degradation. The artificial intelligence may further be configured to predict the occurrence of an adverse event, such as a microbiological contamination (e.g., mold) event occurring based on current system parameters or trends. By providing real time air conditioning system status and predictions regarding future system behavior, maintenance issues are identified proactively, reducing or eliminating costly outages.

Figure 1:
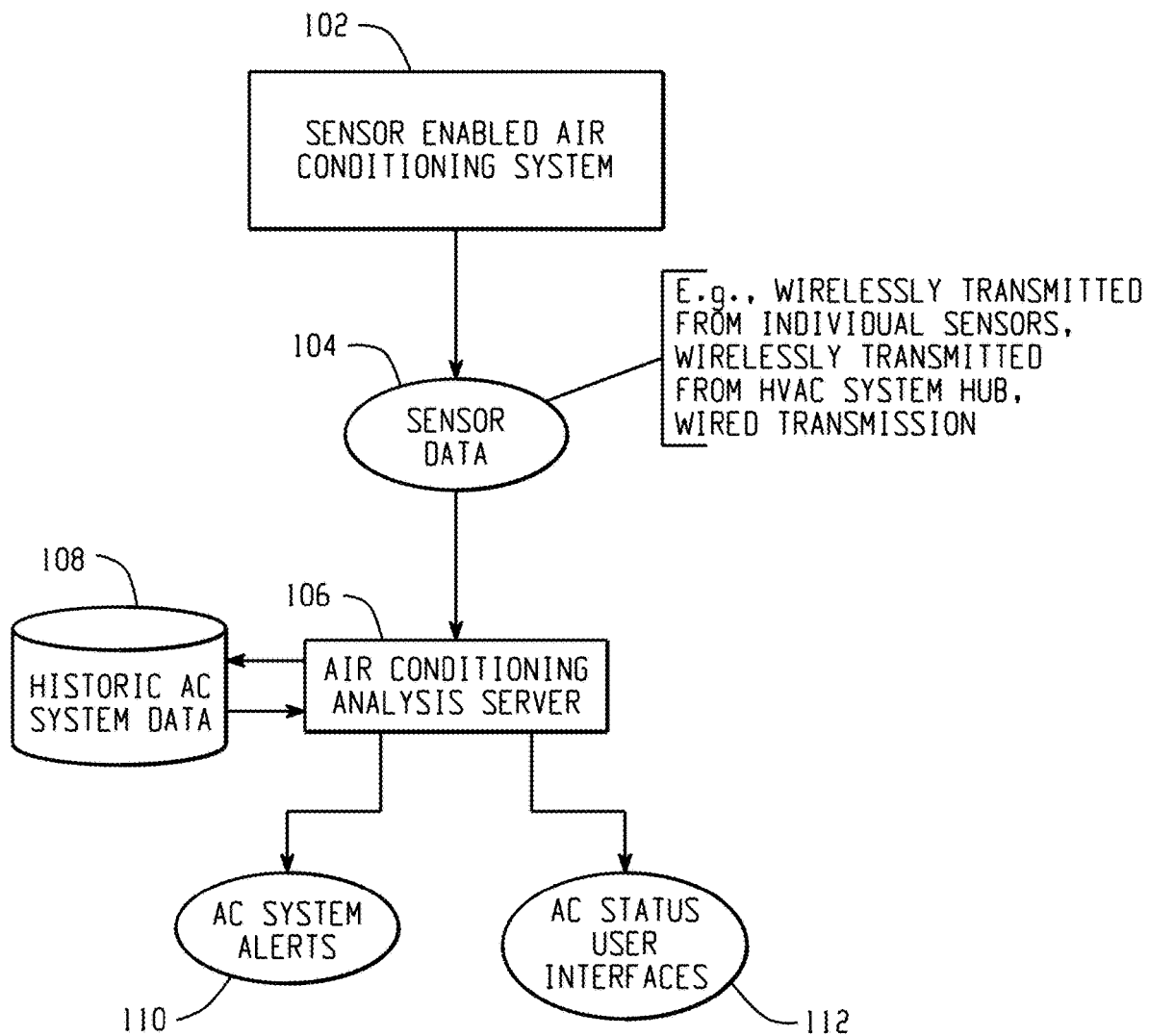
FIG. 1 is a block diagram depicting a processor-implemented system for providing artificial-intelligence-based maintenance of an air conditioning system.

FIG. 1 is a block diagram depicting a processor-implemented system for providing artificial-intelligence-based maintenance of an air conditioning system. An air conditioning system 102 containing one or more sensors (e.g., a camera, a humidity sensor, a temperature sensor, an enthalpy sensor, a magnetic sensor, a substance concentration sensor) captures sensor data 104 and transmits that sensor data 104 to an air conditioning analysis server 106. In one embodiment, each of the sensors in the air conditioning system 102 includes a wireless transmitter by which it can transmit sensor data 104 directly to the analysis server 106 or to an intermediate device (e.g., a data hub) which can forward sensor data 104 to the analysis server 106 in a wired or wireless fashion. The air conditioning analysis server 106 stores the sensor data 104 in a historic AC system data repository 108.

The server provides analysis of the current air conditioning system 102 based on the sensor data 104, where in certain embodiments, that analysis is provided with reference to historic AC system data 108 for the particular air conditioning system 102 being evaluated, and in certain instances data associated with other air conditioning systems. For example, artificial intelligence, such as in the form of a neural network, is trained based on historic AC system data 108 (e.g., image data, temperature data, humidity data, dust levels) and corresponding observed (or determined) system statuses (e.g., level of dust corresponding to image data, microbiological contamination determined corresponding to temperature and humidity data, time until filter needs changed based on differential pressure data at that filter). The analysis server 106 can provide analysis on the current state of the air conditioning system 102 and predicted future status (e.g., time until cleaning needed, time until microbiological contamination likely under current conditions, time until filters need replaced) in the form of AC system alerts 110 and reporting on AC status user interfaces 112 made available locally at the analysis server 106 or remotely (e.g., over a computer network or the Internet via a web server, via text message, pager message, robo-telephone calls, email, facsimile, printed message, or the like).

Figure 2:
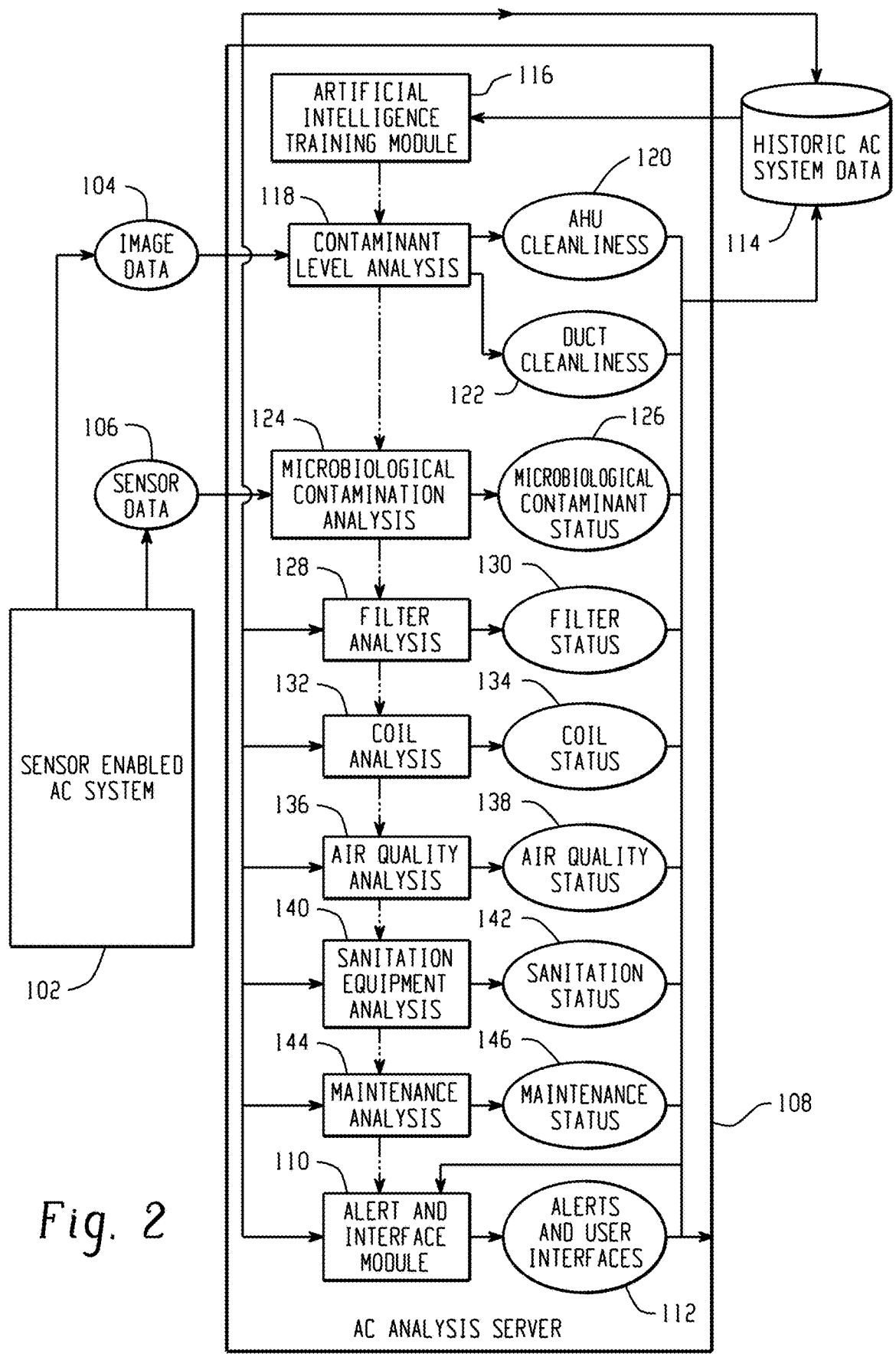
FIG. 2 is a block diagram depicting example components of an AC analysis server system.

FIG. 2 is a block diagram depicting example components of an AC analysis server system. A sensor enabled AC system 102 includes sensors that capture data such as image data 104 (e.g., images internal or external to the AC system) and sensor data 106 and transmit that data 104, 106 to an AC analysis server 108. The AC analysis server 108 receives the data and can provide one or more of a number of different types of analyses of the current status of the AC system 102 and predicted future status of that system 102. Results of the one or more analyses are output from the AC analysis server 108 via an alert and interface module 110 that can take the form of user interfaces (e.g., accessed via a web browser and displayed on a computing device) or other types of electronic messages.

The data received at the AC analysis server may be stored in a historic AC system data repository 114 for future analysis. The historic system data stored in the repository 114 for the present AC system and/or other AC systems may also be used for training and refining the analysis logic of the AC analysis server 108. For example, each of the analyses that the AC analysis server 108 is configured to perform may utilize artificial intelligence (e.g., neural networks such as feed-forward neural networks, recurrent neural networks, convolutional neural networks, trained using techniques such as supervised learning, unsupervised learning, reinforcement learning). Such artificial intelligence may be trained using historic AC system data from the repository 114 that spans many air conditioning systems present in a variety of different environments over long periods of time (e.g., years). Through analysis of that historic data and corresponding system conditions (e.g., sensor data associated with a microbiological contamination instance, sensor data associated with a clean filter, sensor data associated with a filter that needed to be changed 3 weeks later), the artificial intelligence can make current AC system 102 status determinations as well as predictions regarding the future status of the AC system 102. During training, the artificial intelligence may learn what types of sensor inputs are helpful for identifying AC system conditions (and predicted future system conditions) such that those particular sensor inputs are used in providing live analysis of the current AC system 102. An artificial intelligence training module 116 accesses historic AC system data 114 and trains one or more instances of artificial intelligence (e.g., neural networks) to provide current and predictive analysis as described further herein.

An AC analysis server may be configured to perform analysis regarding a number of different aspects of an AC system. For example, a contaminant level analysis may consider data such as image data 104 and sensor data 106 to determine a cleanliness level in the air conditioning system, such as an air handling unit (AHU) cleanliness determination 120 or a duct cleanliness determination 122. Those determinations may include an evaluation of a current contamination status (e.g., dust level in weight(mass) per area) and/or a prediction of a future contamination status, such as a prediction of when a relevant part of the AC system 102 will be sufficiently contaminated to warrant cleaning. Such predictive statuses may be used to preemptively alert or schedule maintenance so that cleaning can be performed before a more significant service outage (e.g., an AC system 102 breakdown caused by contamination buildup) occurs.

Traditional contaminant inspections require AC system 102 shutdowns performed on a long term basis (e.g., once per year) using a vacuum test or visual inspection. Such manual operations provide very sparse data and no knowledge about contamination status between inspections. Thus AC system events (e.g., an introduction of dust at an air system intake based on changing conditions (e.g., start of a construction project) a fracture in a duct wall that allows significant dust introduction into the AC system 102 causing environment risks (e.g., health risks, damage to equipment in the air controlled region) and risks to the healthy functioning of the AC system) may go undetected for significant periods of time. The automated data capture (e.g., multiple times per day, hour, minute) and analysis (e.g., multiple times per year, month, day, hour, minute) provide continual insight into AC system operation and prompt alerts of changes to system conditions that warrant intervention. Data captured automatically may be supplemented with data captured (e.g., vacuum tests) during maintenance, routine or otherwise, to provide an even more robust data set for analysis (e.g., for artificial intelligence training.

AC systems are also susceptible to microbiological contamination. Microbes, such as mold, may grow and flourish in an AC system under certain conditions (e.g., high humidity, warm temperature). The AC analysis server 108 may be configured at 124 to analyze data from the AC system to indicate at 126 whether there is currently a likely presence of microbiological contamination in the AC system and/or if and when microbiological contamination may occur in the future based on observed conditions in the AC system.

In another example, an AC analysis server 108 may analyze performance and metrics associated with filters in the AC system 102. Through consideration of sensor data, such as differential pressures measured before and after a filter, a filter analysis 128 can indicate a current filter status and a prediction on when action should be performed relative to a particular one or more filters at 130 in the AC system 128.

In some embodiments, current and predictive analysis can be performed relative to a heating or cooling coil in the AC system 102. A coil analysis 132 considers sensor data (e.g., differential pressure data, enthalpy sensor data) to identify current/predicted status 134 of coils in the system so as to enable maintenance calls including proactive maintenance calls to preempt system malfunctions.

Air quality is important throughout an AC system, not only in the controlled environment (e.g., at the output of the AC system). The quality of air input into the system (e.g., from an outside environment) or within the AC system 102 (e.g., in a duct) can be indicative of current or future problems that may call for remediation. An air quality analysis 136 of air at an AC system intake or within the AC system may provide current or predictive updates on air quality at 138.

Certain AC systems 102 utilize sanitation equipment that may utilize techniques such as ultraviolet light exposure (e.g., in a duct) or introduction of a chemical substance (e.g., a disinfectant agent, a fragrance) into the air. An AC analysis server 108 may receive data that is that is directly indicative (e.g., from the sanitation equipment) or indirectly indicative (e.g., image data from which light from ultraviolet sanitation equipment can be detected) of functioning of the sanitation equipment. Current status and predictions of future status of the sanitation equipment can be made at 140 and output at 142 to the alert and interface module 110.

An AC analysis server 108 can also be configured to track maintenance of the AC system 102. For example, sensor data 106 can include AC system access sensors (e.g., magnetic sensors associated with AC access hatches) that can detect when internals of the AC system 102 are accessed. Based on that access sensor data alone, or in combination with other sensor data such as a decrease in Delta P noted by a differential pressure sensor after a detected access, the AC analysis server 108 can determine that maintenance was performed at 144 and track that maintenance status data 146. For example, the AC analysis server 108 can correlate detected maintenance activity with a maintenance schedule (e.g. routine maintenance, maintenance requested based on an AC analysis server 108 alert) and track the performance of AC system 102 maintenance. The maintenance analysis 144 can also be configured to detect anomalous access to the AC system (e.g., access that does not correspond with expected access of a maintenance schedule, access for a period of time not likely to be associated with legitimate maintenance, access that is not correlated with a system performance benefit (e.g. improved filter performance)) and issue corresponding alerts that indicate possible malicious intrusion into the AC system 102 (e.g., to introduce a harmful foreign substance such as a biological agent into the controlled volume).

An AC analysis server may provide current sensor data values, determined AC system status, and AC system predictions via one or more user interfaces provided to a user device (e.g., a computer system, a smart phone system, an email report, a facsimile). The user interfaces may enable tracking of AC system data and statuses across multiple locations and sub-portions of particular locations. FIG. 3 depicts a user interface for navigating to data associated with a particular AC system of interface. A top display provides a map with selectable indicators for selecting a particular site of interest. A bottom display provides an image of a particular location (e.g., selected from the top map), which enables selection of an AC system servicing all or a portion of that location, such as via a mouse click on a location on the image or a name of a section of the location. Text included with the bottom location image may indicate a name of a portion of a location and summary statistics such as a number of status parameters evaluated, a number of parameters indicating operation within specification, a number of parameters of concern operating outside of specification, and a number of parameters for which appropriate data is not being received.

Figure 4:
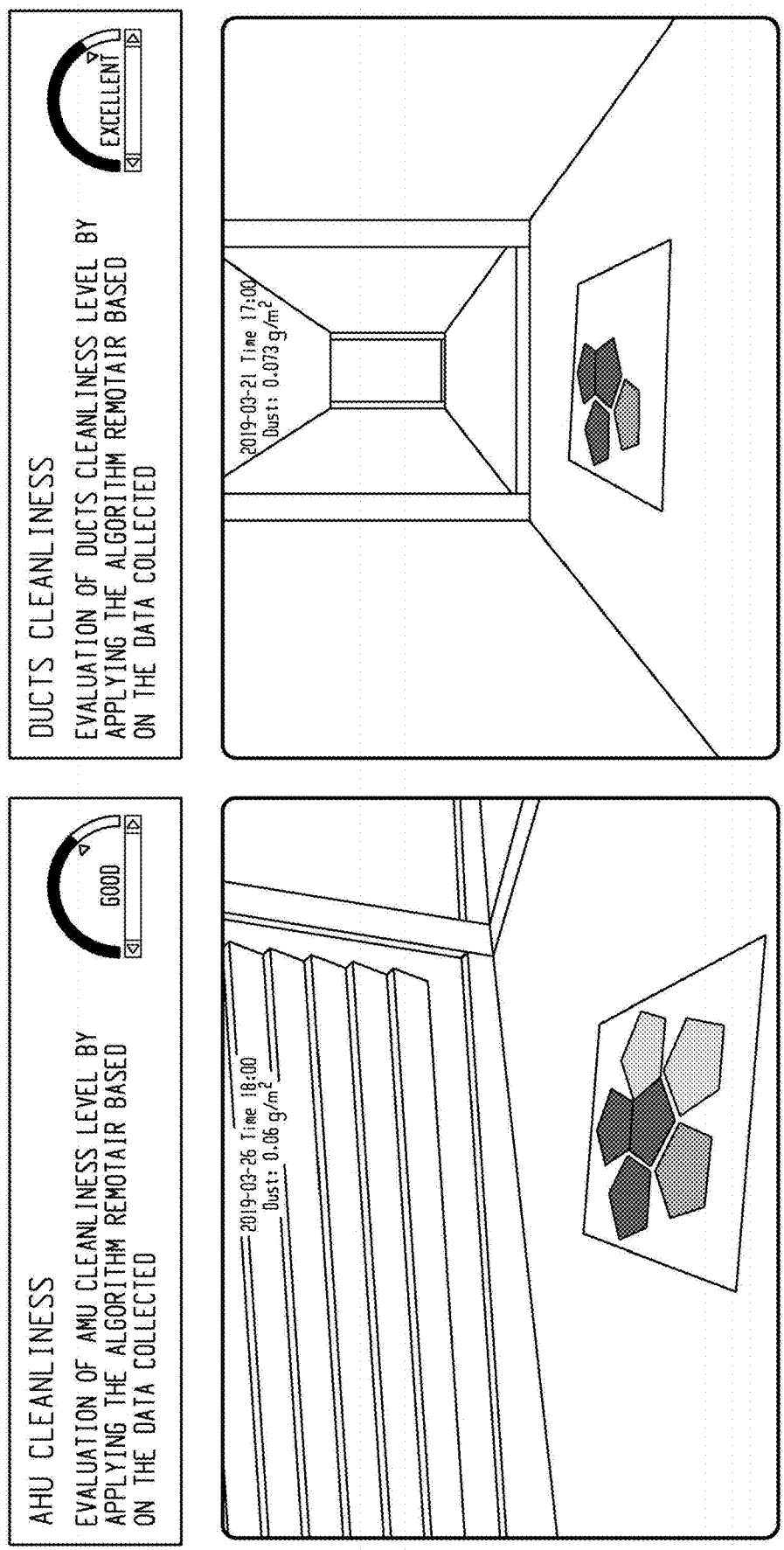
FIG. 4 depicts an example summary data user interface associated with an air plant.

Upon selection of a location, such as via the interfaces of FIG. 3, a user may be provided summary information about a variety of AC system statuses being analyzed. FIG. 4 depicts an example summary data user interface associated with an air plant. The user interface identifies each of a plurality of statuses being tracked along with a current qualitative assessment of the AC system relative to that status. The user interface includes two cleanliness statuses, one for the air handling unit (currently at Good status) and the other for a duct (currently at Excellent status) in the AC system. The cleanliness statuses provide a most recent image taken along with an estimated dust level (i.e., 0.06 g/m$^2$ for AHU, 0.073 g/m$^2$ for duct) to provide further summary data on cleanliness. Overall statuses for microbiological factors and coil status are indicated as Good. Sanitation equipment is indicated as currently functioning at an Excellent level. Filter status is indicated as currently being Poor, while air quality within the AC system is currently reported as being at a Medium level. Maintenance Control is indicated at a Bad level.

Figure 5:
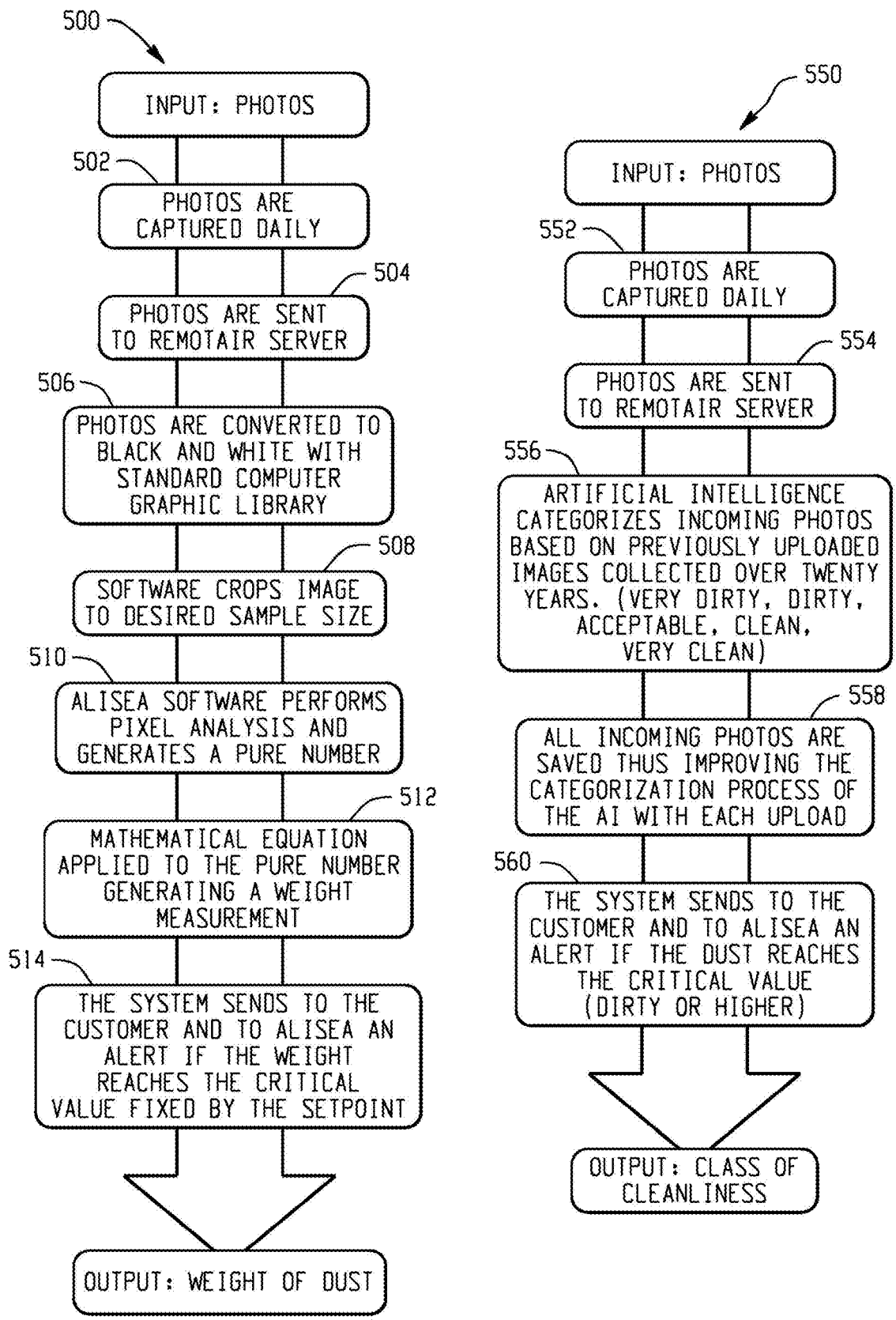
FIG. 5 depicts two flow diagrams for determining AC system cleanliness.

In embodiments, AC system cleanliness is estimated based on image data received from the AC system. FIG. 5 depicts two flow diagrams for determining AC system cleanliness. In a first example process, images are captured (e.g., using a digital camera) periodically at 502 and are sent to a server for storage and analysis at 504. The images are converted to black and white at 506 and are cropped at 508. A pixel analysis is performed at 510 to indicate a number associated with the pixel values of the image. And at 512 a mathematical operation is performed on the pixel value number to determine a dust weight associated with that image. The dust weight is provided to a user for viewing on a user interface upon access of the user interface by the user. An alert may be proactively sent to the user (e.g., via text message, email, pager message, on the user interface) should the dust weight vale exceed a threshold that could be automatically set based on historical values or artificial intelligence analysis, or via manual operation by the user.

In one example, a pixel value for an image may be determined based on an average pixel value associated with a region of interest of an image, such as a cropped portion of the image associated with a reference object (e.g., a sticker or decal) within the region of interest of the AC system (see the AHU cleanliness and Ducts cleanliness images of FIG. 4). The average pixel value for the image is calculated and, in one example, is converted to a contamination weight based on a formula. In one implementation the contamination weight is calculated according to:

$$\text{Weight}=m*\text{average\_value}+q$$

where Weight is the contamination weight, m is a constant value, average_value is the pixel value for the image (e.g., calculated by summing all pixel values and dividing by the number of pixels), and q is a normalization value. In one embodiment, the q normalization value is set based on an initial image or an image in a series of images having a lowest level of contamination (e.g., a first image after cleaning). In that embodiment:

$$q=-m*\text{average\_value\_min}$$

where average_value_min is the average pixel value for the image associated with a lowest amount of contamination.

The calculated weight contamination weight (e.g., in g/m$^2$) may be compared to a threshold value to determine whether an alert should be issued indicating that the AC system should be cleaned. A rate of change of contamination weight (e.g., over the course of two or more images) may be used to estimate when the AC system will be ready to be cleaned, such as via linear or other interpolation techniques. A neural network may also be used in combination with one or more contamination weight values to determine current and predictive cleanliness statuses.

Figure 6:
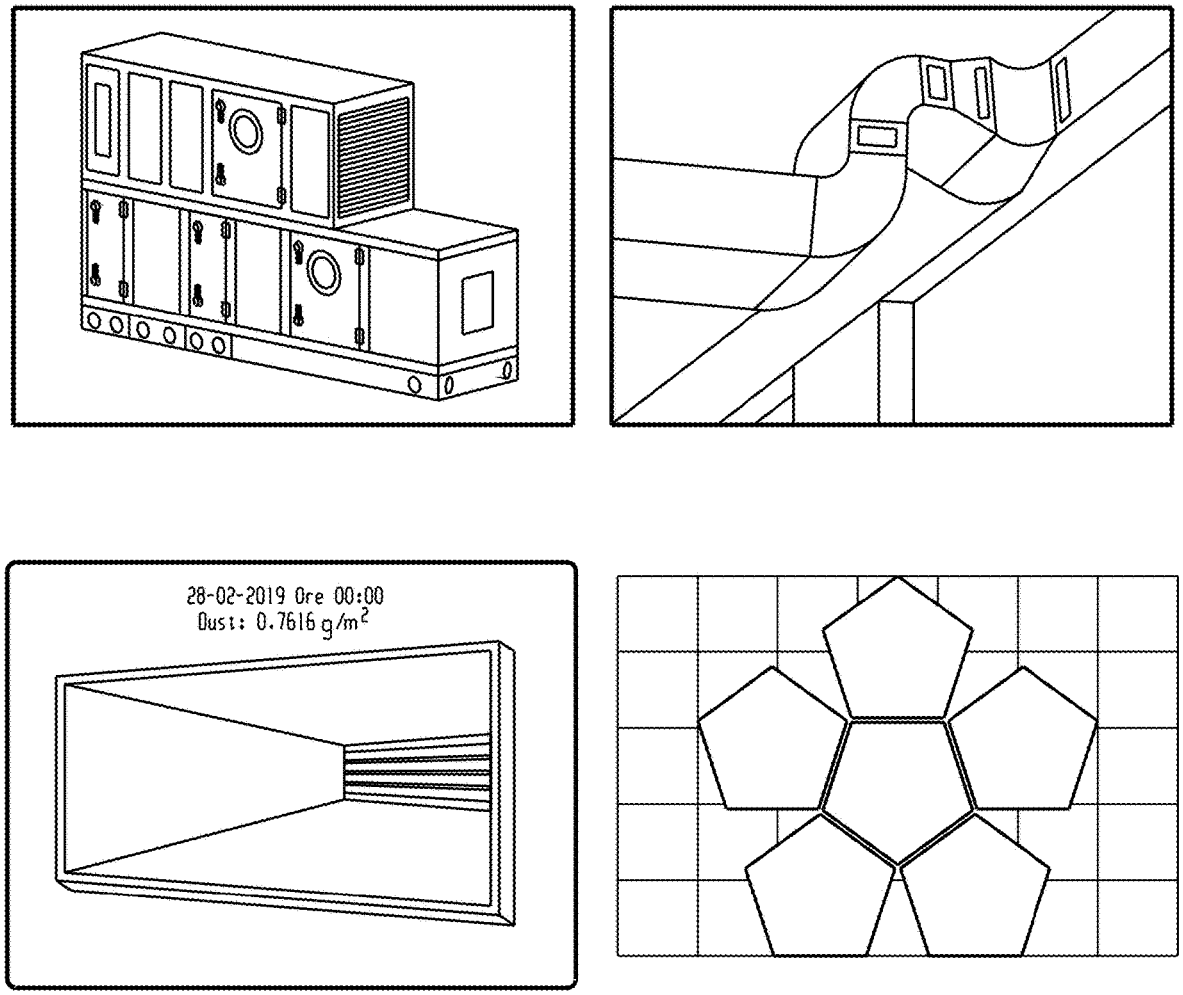
FIG. 6 depicts example image capture locations and a reference object.

In a second example 550, image data is again captured at 552 and sent to an AC analysis server at 554. At 556 artificial intelligence is used to classify the current state of the AC system based on the image data. For example, a neural network may be trained using large numbers of images captured from AC systems along with their corresponding qualitative cleanliness statuses (e.g., Very Clean, Clean, Acceptable, Dirty, Very Dirty). The current image received at 554 is provided to the trained neural network to classify the current AC system state. The current image may be saved, along with its associated cleanliness state, to further train the neural network at 558. In one embodiment, further neural network training may be in a supervised or semi-supervised state, where the system's classification of an AC system state by the artificial intelligence may be augmented or rejected by a human operator. Based on the AC system state, alerts may be sent and user interfaces may be updated at 560. FIG. 6 is a diagram depicting example locations for image capture devices (e.g., an AHU and a duct system), an example image from a duct system, and an example reference image that may be positioned in the imaged volume as a reference object to normalize captured images across AC systems, such as for instances with different lighting levels in the imaged area (e.g., a duct, an AHU). The reference object may include one or more identifiers such as numbers, bar codes, QR codes, so that a captured image can be associated with its corresponding location when analyzing and storing image data.

Figure 7:
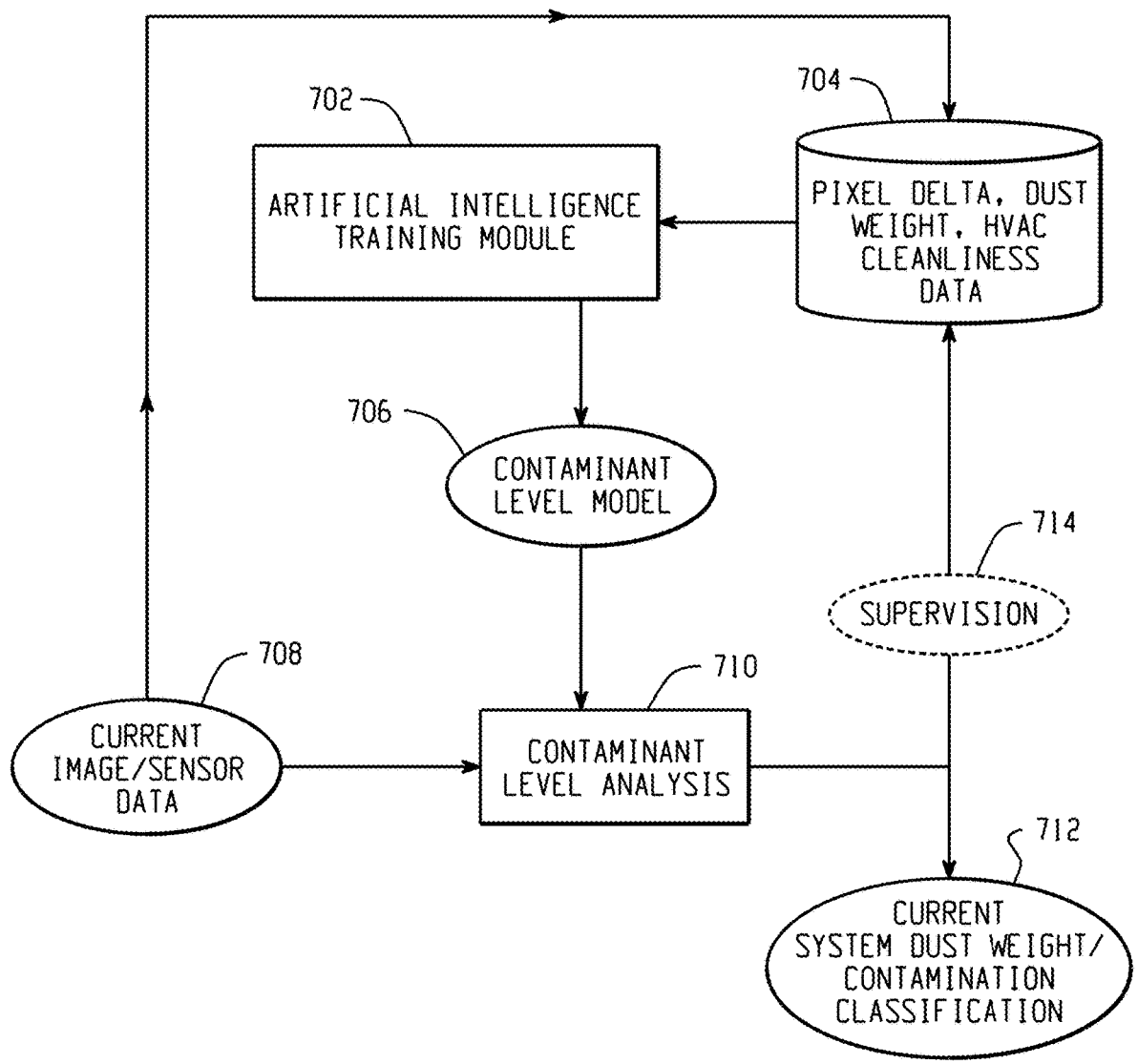
FIG. 7 is a flow diagram depicting an artificial intelligence training module training a contaminant level model.

FIG. 7 is a flow diagram depicting an artificial intelligence training module training a contaminant level model. An artificial intelligence training module 702 receives historic AC data 704 from the current AC system and/or other AC systems that has been captured over time. Based on that data and associated estimated or predicted metrics (e.g., estimated contamination weights, qualitative cleanliness assessments, a time until cleaning should be performed), a contaminant level model 706 (e.g., a neural network) is trained to provide those estimated or predicted metrics based on current image, sensor, and or other data 708 via a contaminant level analysis module 710. The contaminant value 712 determined using the contaminant level model 706 is output from the analysis for display on a user interface or issuance of an alert. The determined contaminant level 712 along with the image/sensor data 708 that resulted in that determined level 712 may be stored at 704 and feedback to the training module 702 in an unsupervised or supervised fashion 714 to further train the contaminant level model 706.

FIG. 8 is a diagram depicting example cleanliness status and predictive information displayed on a user interface. For each of three cameras in the AC system, a current dust contamination level is calculated and displayed based on pixel values of one or more images from those locations. Based on the current status, a current required action (e.g., continue surveillance, perform maintenance, schedule maintenance) is presented. A predictive analysis (e.g., using an artificial intelligence model) is also provided that predicts when the system will enter into a Bad status level of cleanliness. This prediction may be used to proactively schedule maintenance so that the AC system is cleaned before the expiration of that predicted time period. FIG. 9 is a diagram depicting example captured images, estimated dust contamination values based on those captured images, and graphs depicting contamination levels over a period of time. Estimates over time may be utilized to identify trends and to inform predictive analysis.

Figure 10:
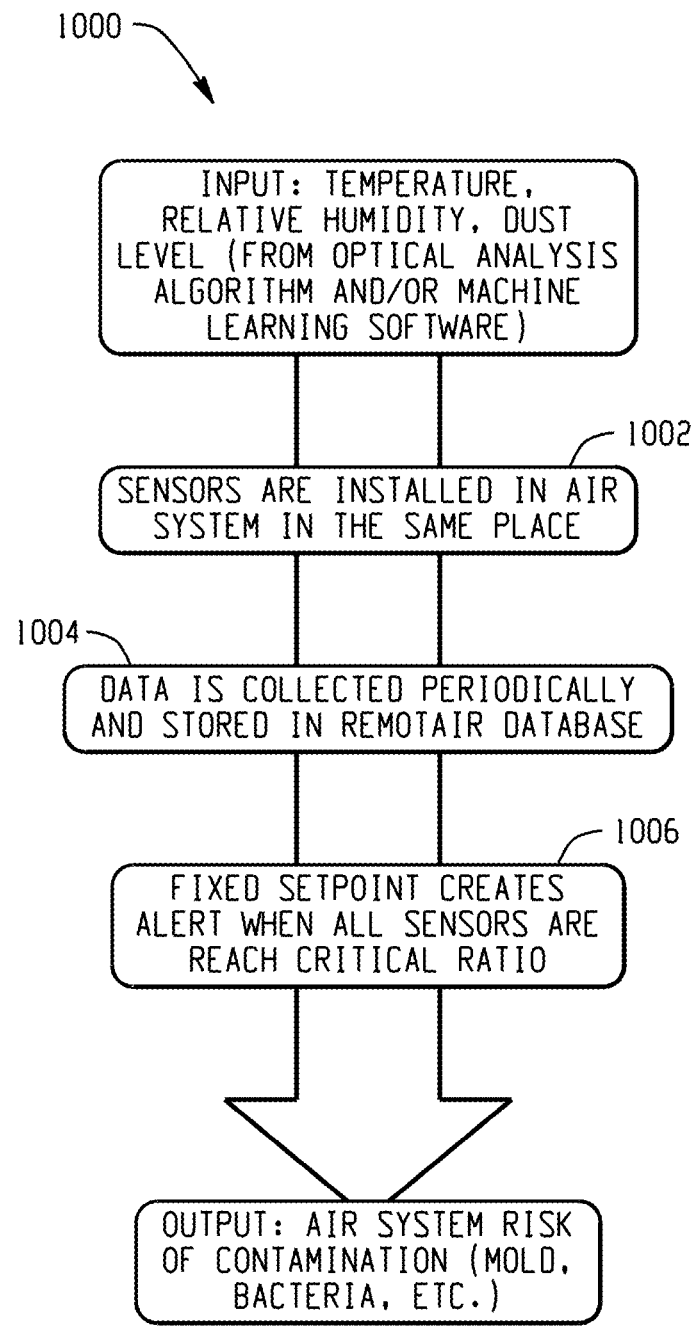
FIG. 10 is a flow diagram depicting an example process for assessing system risk of contamination.

An AC analysis system may also make determinations relative to current microbiological contamination in the AC system and predictions on likelihoods associated with microbiological contamination based on current system parameters (e.g., temperature, humidity, measured or determined dust contamination levels). FIG. 10 is a flow diagram depicting an example process for assessing system risk of contamination. Sensor data is captured at one or more locations of the AC system at 1002 and is transmitted to the AC analysis server at 1004 for storage and analysis. Set point thresholds may be utilized at 1006 to issue alerts when one or more sensor data levels alone (e.g., humidity, temperature) or a combination of multiple factors (e.g., a ratio based on temperature, humidity, and dust contamination thresholds) exceeds a threshold.

Figure 11:
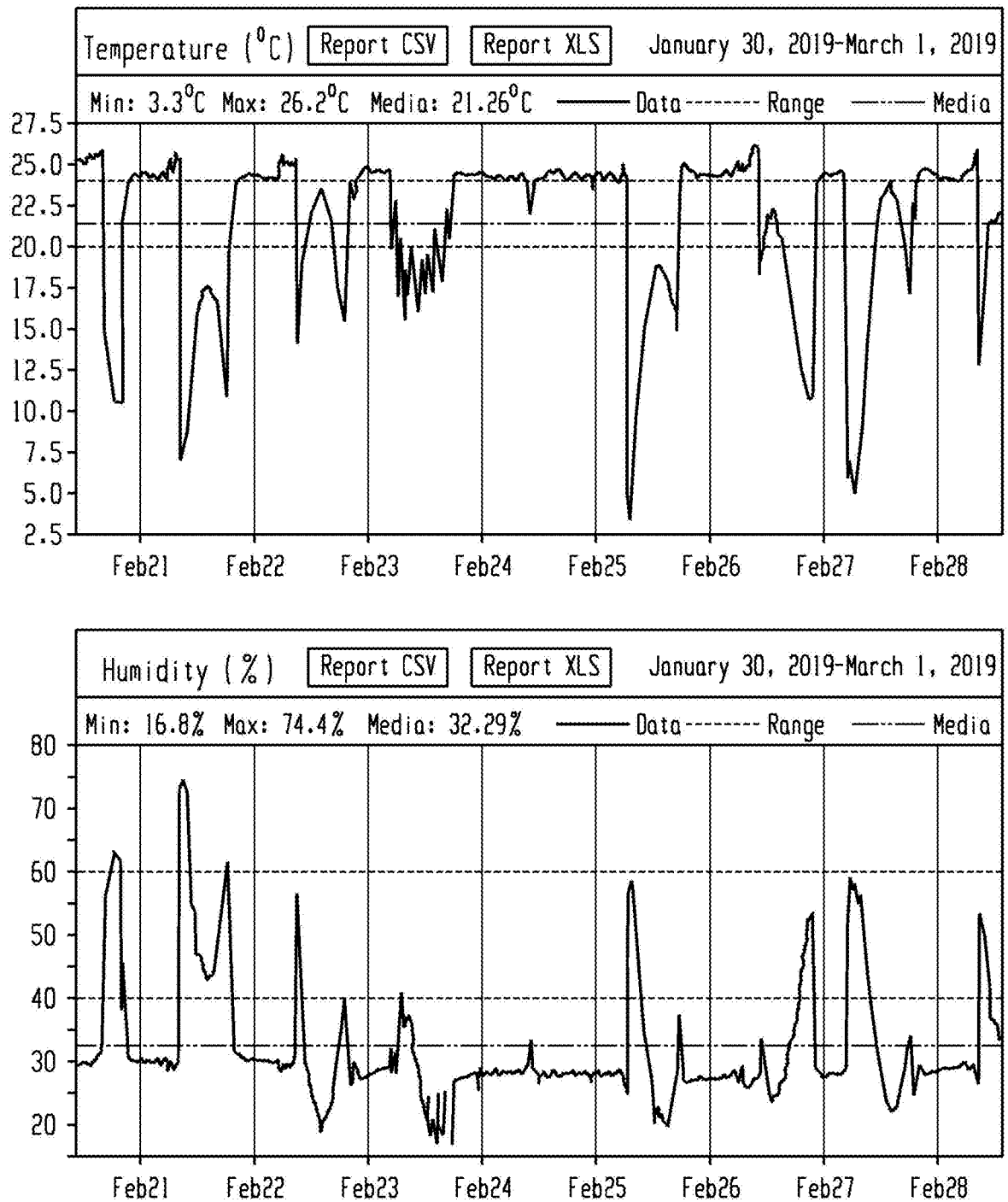
FIG. 11 identifies an example where temperature and relative humidity measurements are used to provide a microbiological contamination assessment.

The relevant parameters can, alone or in combination, also be used to provide current and future assessment of contamination risk. For example, FIG. 11 identifies an example where temperature and relative humidity measurements are used to provide a microbiological contamination assessment. FIG. 11 depicts tracking of temperature and humidity data over time, where carbon dioxide and volatile concentrations can similarly be tracked and visualized. Based on a weighted value associated with those parameters, a current risk of microbiological contamination can be me made. Artificial intelligence, formula, or rules based analysis may also be used to indicate when a system is likely to be at risk for microbiological contamination based on current conditions within the AC system or trends in AC system parameters. In one embodiment, average humidity, temperature, and dust levels over a preceding day are ascertained. Fuzzy logic is used to retrieve a valuation associated with those factors predisposing the AC system to microbiological contamination, and a current risk status is identified based on those values.

Figure 12:
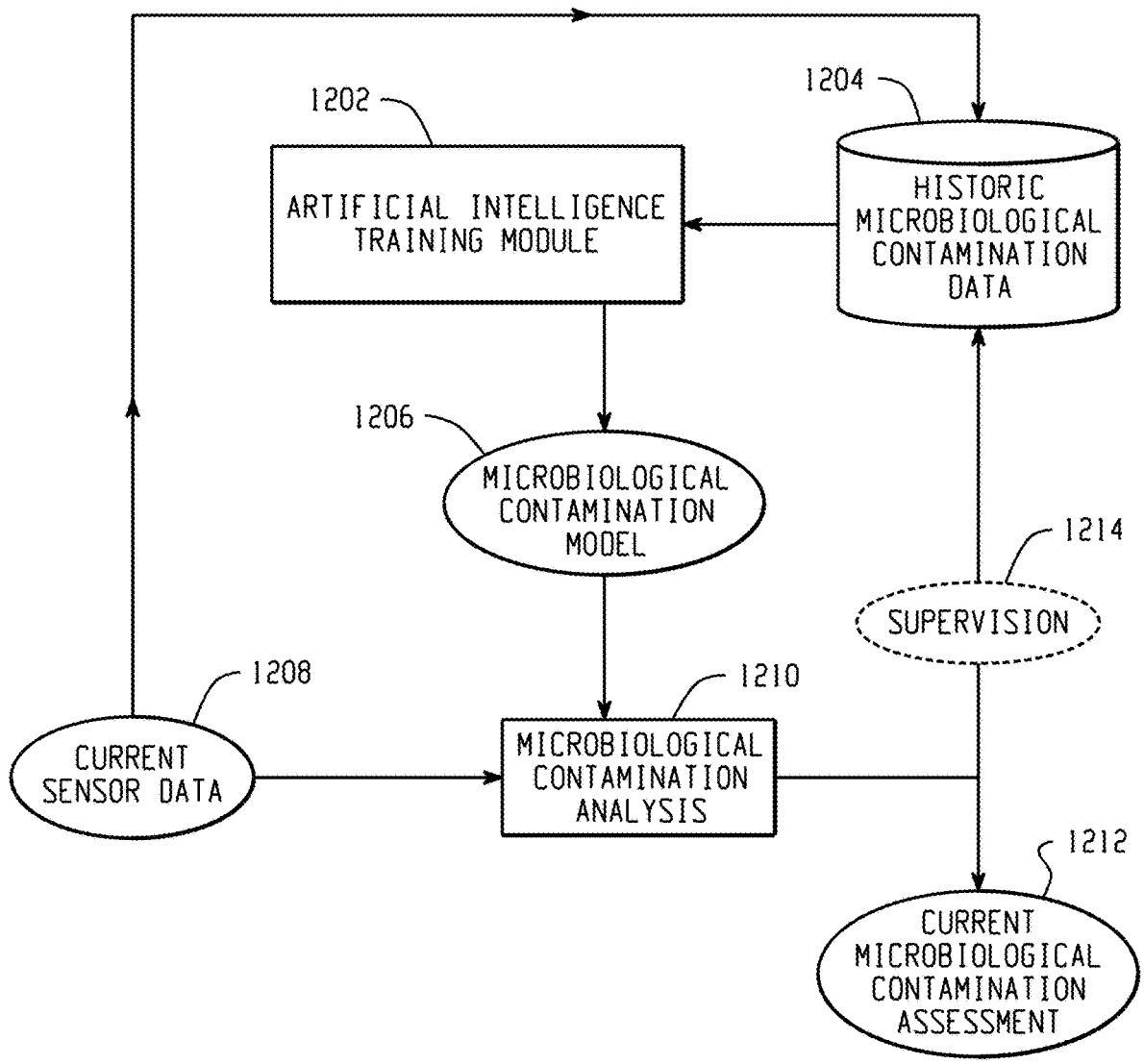
FIG. 12 is a flow diagram depicting an artificial intelligence training module training a microbiological contamination model.

FIG. 12 is a flow diagram depicting an artificial intelligence training module training a microbiological contamination model. An artificial intelligence training module 1202 receives historic microbiological contamination relevant data 1204 from the current AC system and/or other AC systems that has been captured over time. Based on that data and associated estimated or predicted metrics (e.g., estimated current contamination, estimated time to contamination, actual time after data capture when contamination was observed), a microbiological contamination analysis model 1206 (e.g., a neural network) is trained to provide those estimated or predicted metrics based on current image, sensor, and or other data 1208 and trends via a microbiological contamination analysis module 1210. The contamination assessment 1212 determined using the microbiological contamination model 1206 is output from the analysis for display on a user interface or issuance of an alert. The determined contamination assessment 1212 along with the image/sensor data 1208 that resulted in that determined contamination assessment 1212 may be stored at 1204 and feedback to the training module 1202 in an unsupervised or supervised fashion 1214 to further train the model 1206.

Figure 14:
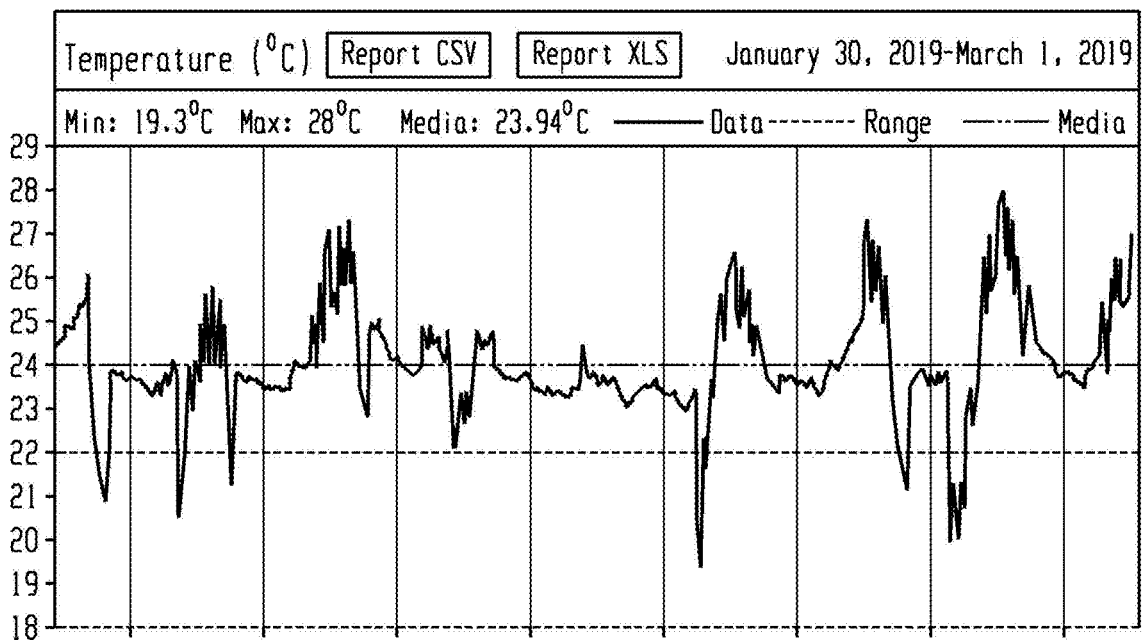
FIGS. 14 and 15 depict another example, where temperature and humidity are used as input data for determining a microbiological contamination risk.
Figure 15:
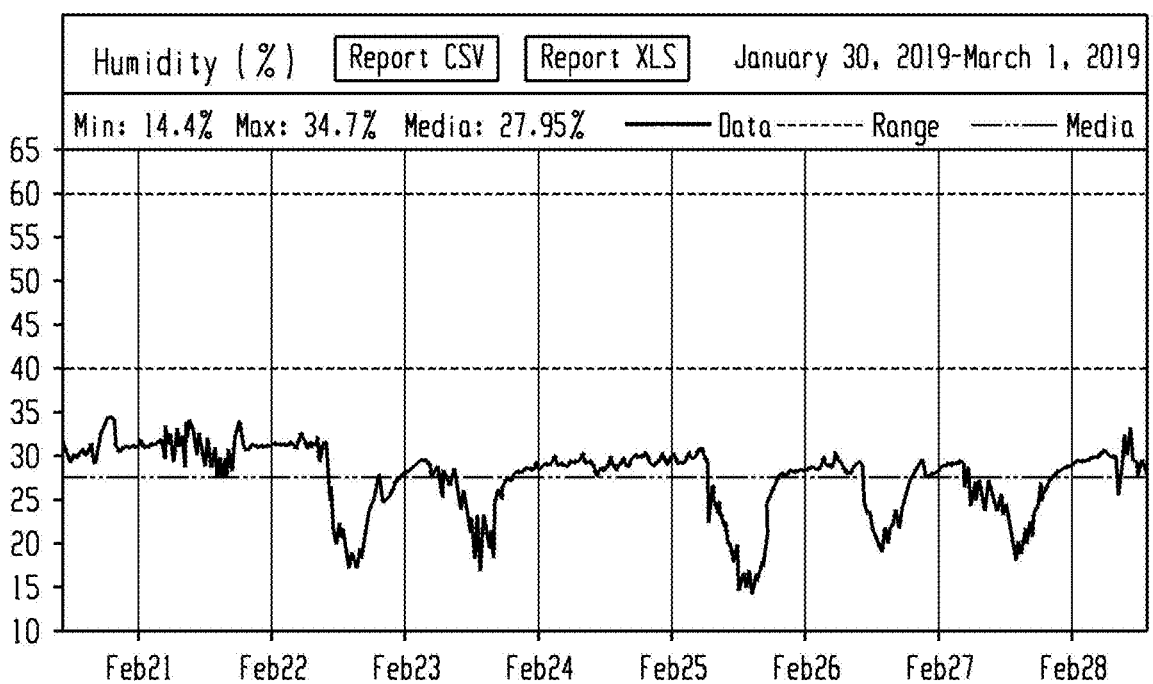

FIG. 13 depicts microbiological contamination assessments at different points in an AC system. At each location, a dust contamination (measured, estimated, derived), a measured humidity level, and measured temperature is displayed. A microbiological contamination risk is displayed at each location, indicating a current likelihood of contamination based on the displayed metrics. A suggested course of action is also displayed for each location. FIGS. 14 and 15 depict another example, where temperature and humidity are used as input data for determining a microbiological contamination risk.

Figure 16:
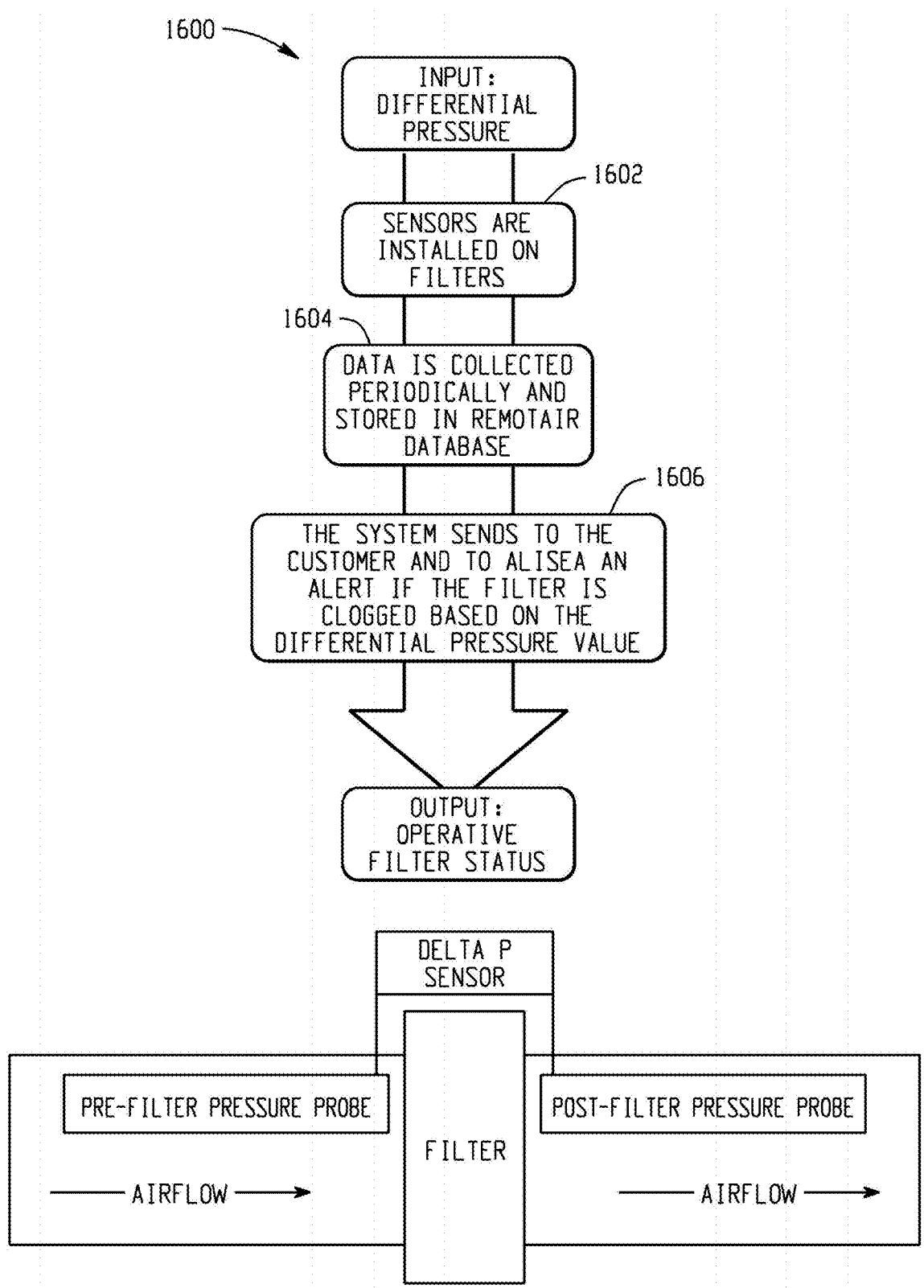
FIG. 16 is a flow diagram depicting an example process for measuring the status of a filter in an AC system.

An AC analysis system may also be configured to identify and make predictions regarding status of filters in the system. FIG. 16 is a flow diagram depicting an example process for measuring the status of a filter in an AC system. Sensor data is captured at 1602 using one or more sensors that are installed at or near a filter (e.g., a sensor with probes positioned before and after the filter that calculates a before and after reading and transmits a single change in pressure metric observed between the probes). The sensor data is transmitted to an AC analysis server for storage and analysis at 1604. Evaluations of the current and predicted filter states are made, with alerts and graphical user interface updates being provided based on those analyses at 1606.

Differential pressure sensors may be utilized to measure aspects of filter status. An unclogged filter allows air to pass through with little resistance, such that a measured pressure before the filter is substantially equal to a measured pressure after the filter. A clogged filter can result in a backup of air before the filter, such that a pre-filter pressure sensor registers a higher pressure reading that a post-filter pressure sensor. A high difference in pressures from before a filter to after a filter can indicate an impediment to the free flow of air through the filter (e.g., that the filter is clogged). An AC analysis server can be configured to determine a current state of a filter based on a current differential pressure sensor reading. An analysis server can also provide predictions regarding future filter status (e.g., an amount of time before a filter enters an unsatisfactory state and should be changed) based on trends or artificial intelligence. In one example artificial intelligence recognizes patterns in differential pressure data to provide an estimate of when a filter should be replaced based on differential pressure patters in historic systems.

Figure 17:
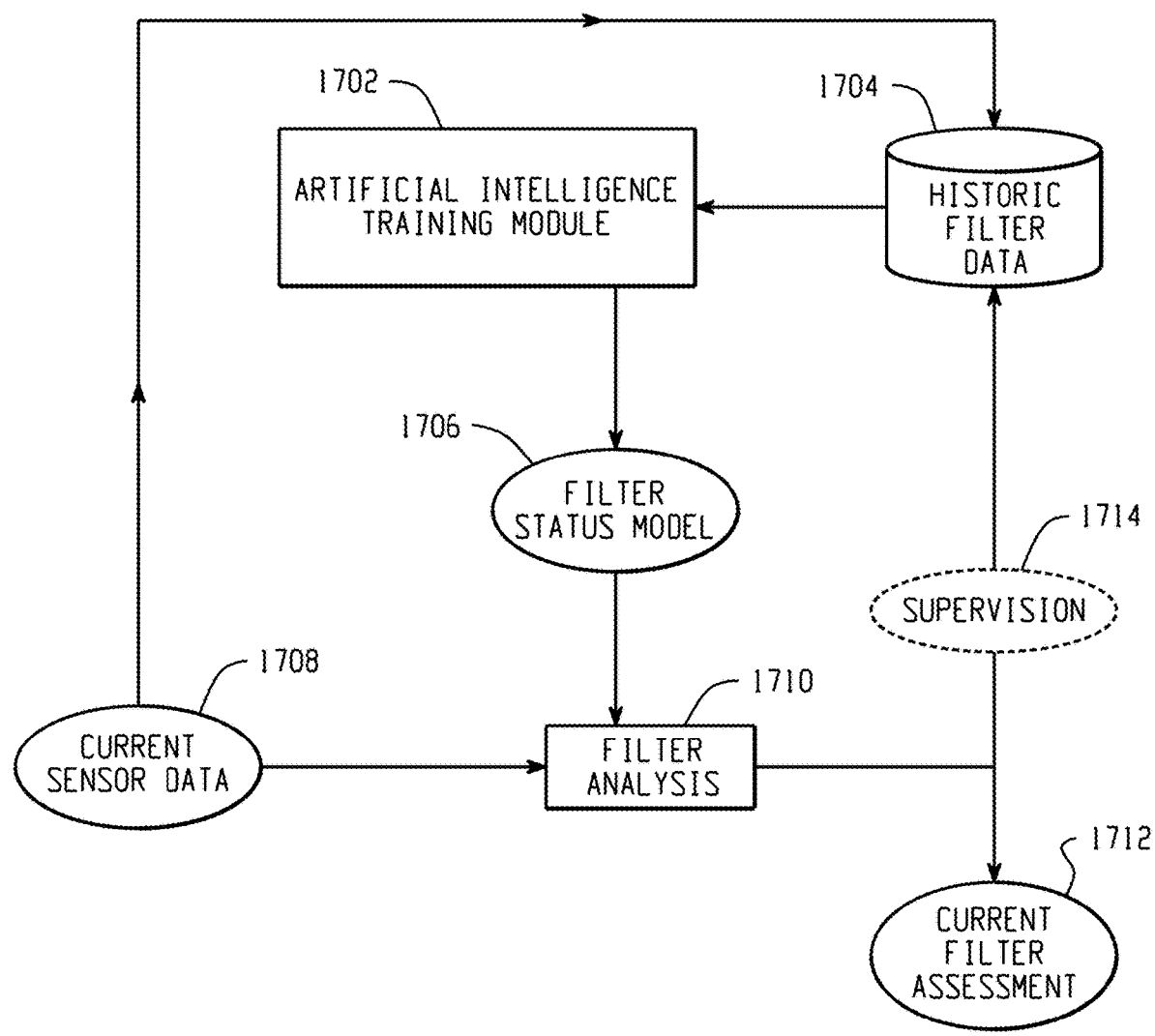
FIG. 17 is a flow diagram depicting an artificial intelligence training module training a filter status model.

FIG. 17 is a flow diagram depicting an artificial intelligence training module training a filter model. An artificial intelligence training module 1702 receives historic filter performance relevant data 1704 from the current AC system and/or other AC systems that has been captured over time. Based on that data and associated estimated or predicted metrics (e.g., current filter clogged status, estimated time to unsatisfactory filter performance, actual time to unsatisfactory filter performance after data capture), a filter analysis model 1706 (e.g., a neural network) is trained to provide those estimated or predicted metrics based on current image, sensor, and or other data 1708 and trends via a filter analysis module 1710. The filter assessment 1712 determined using the filter model 1706 is output from the analysis for display on a user interface or issuance of an alert. The determined filter assessment 1712 along with the image/sensor data 1708 that resulted in that determined filter assessment 1712 may be stored at 1704 and feedback to the training module 1702 in an unsupervised or supervised fashion 1714 to further train the model 1706.

Figure 18:
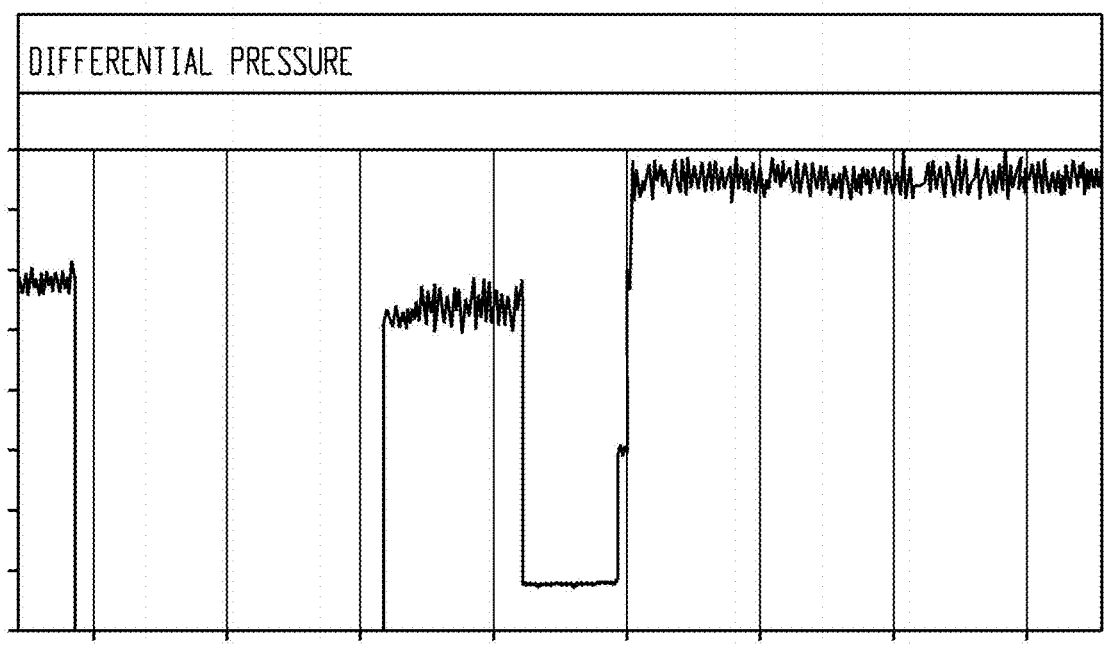
FIG. 18 depicts example filter performance and prediction user interfaces.

FIG. 18 depicts example filter performance and prediction user interfaces. For each of a plurality of differential pressure sensors positioned at different filters, a current differential pressure value and corresponding characterization of filter performance (e.g., Excellent, Good, Medium, Bad, Poor) is displayed. A required action based on current performance is displayed. Further, a prediction on when the corresponding filter should be changed to avoid AC performance issues is displayed. The predictive analysis may be generated in a variety of ways based on a current filter status and historic performance trends for that filter or other filters, based on a current performance trend associated with that filter, filter type, or other filters, artificial intelligence trained based on historic data associated with other filters, etc. The bottom of FIG. 18 depicts differential pressure data associated with one filter over time.

Figure 19:
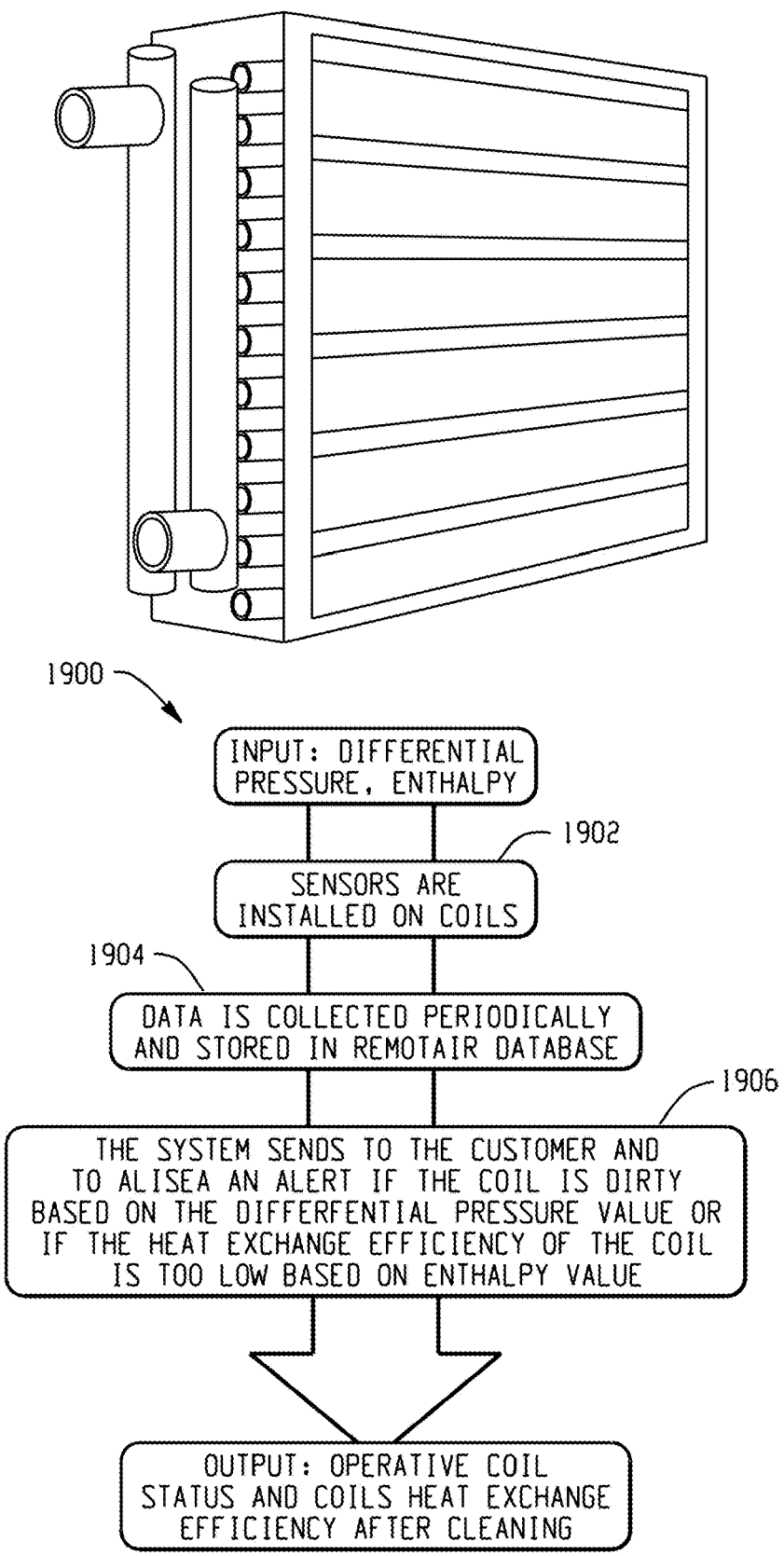
FIG. 19 depicts a flow diagram depicting a process for monitoring performance of an AC system coil.

Performance and predictions regarding other AC system components can also be analyzed using an AC analysis server. FIG. 19 depicts a flow diagram depicting a process for monitoring performance of an AC system coil. Sensor data is captured at 1902 using one or more sensors that are installed at or near a coil. The sensor data is transmitted to an AC analysis server for storage and analysis at 1904. Evaluations of the current and predicted coil states are made, with alerts and graphical user interface updates being provided based on those analyses at 1906. For example, an AC analysis server may be configured to provide alerts to a user if the coil is deemed dirty based on a differential pressure value or if a heat exchange efficiency of the coil falls below an enthalpy threshold value. In one example, artificial intelligence recognizes patterns in coil-relevant sensor data prior to an alert being distributed for coil cleaning, providing a time estimate on when coils will need to be cleaned.

Figure 20:
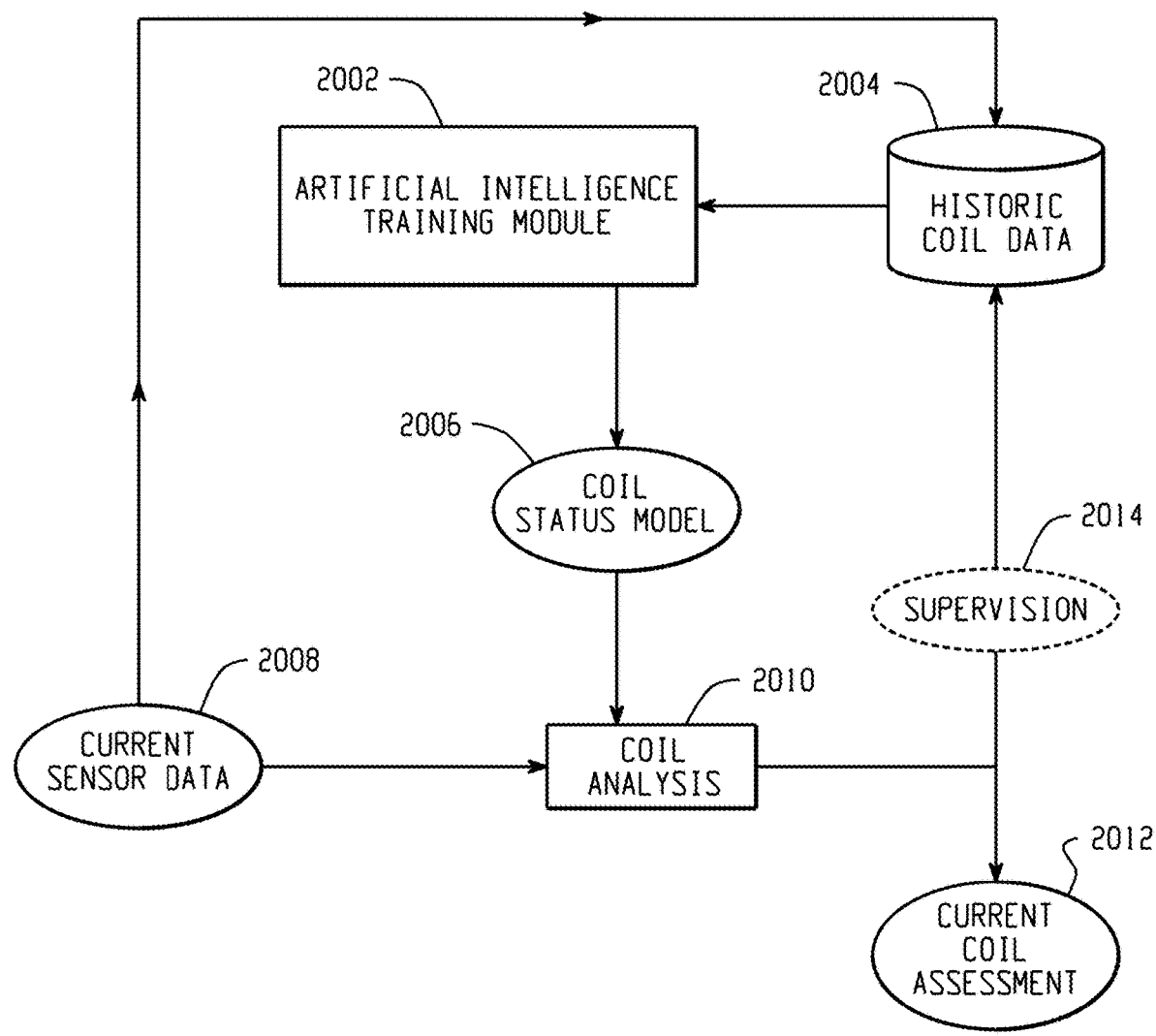
FIG. 20 is a flow diagram depicting an artificial intelligence training module training a coil status model.

FIG. 20 is a flow diagram depicting an artificial intelligence training module training a coil model. An artificial intelligence training module 2002 receives historic coil performance relevant data 2004 from the current AC system and/or other AC systems that has been captured over time. Based on that data and associated estimated or predicted metrics (e.g., current coil status, estimated time to unsatisfactory coil performance, actual time to unsatisfactory coil performance after data capture), a coil analysis model 2006 (e.g., a neural network) is trained to provide those estimated or predicted metrics based on current image, sensor, and or other data 2008 and trends via a coil analysis module 2010. The coil assessment 2012 determined using the coil model 2006 is output from the analysis for display on a user interface or issuance of an alert. The determined coil assessment 2012 along with the image/sensor data 2008 that resulted in that determined coil assessment 2012 may be stored at 2004 and feedback to the training module 2002 in an unsupervised or supervised fashion 2014 to further train the model 2006.

Figure 22:
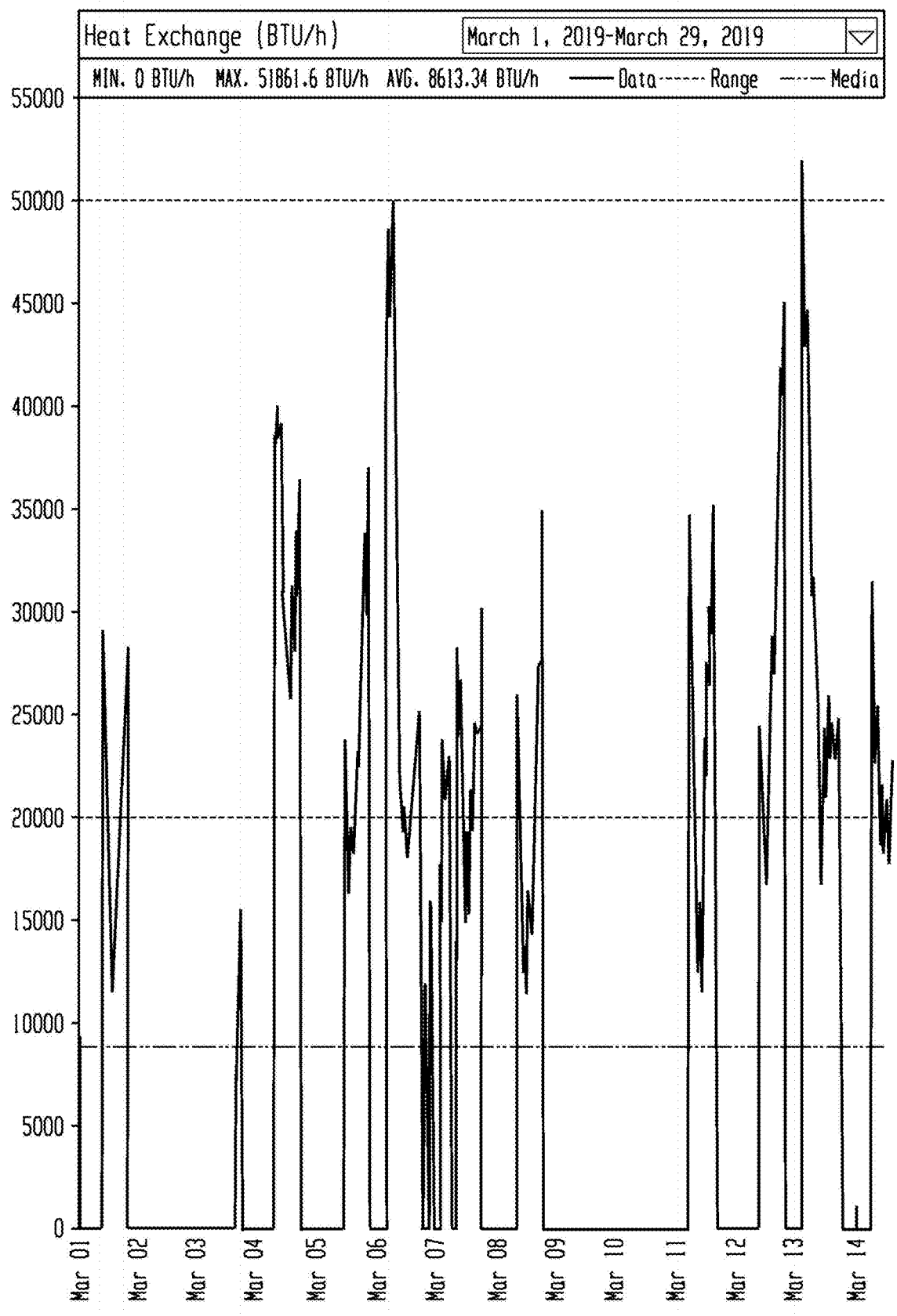
FIG. 22 depicts example heat exchange data captured and stored for a coil over time.

FIG. 21 depicts an example user interface for providing data and predictions regarding coil status and performance. For a particular coil, a differential pressure value and qualitative assessment of performance of that coil (i.e., Good) is provided. A current action item is displayed along with a prediction of when the coil should be cleaned (e.g., using a neural network that considers differential pressure as an input). For that same coil, additional data is provided based on enthalpy sensor data that provides a heat exchange metric. The current heat exchange metric value along with a qualitative assessment and suggested current action is provided. A prediction of when the coil should be cleaned is also provided (e.g., using a neural network that considers enthalpy sensor data (e.g., current, trends) as an input). The heat exchange user interface section further depicts a performance improvement (i.e., +23%) observed after a detected cleaning. In one example, that performance improvement is calculated based on a detected coil maintenance (e.g., based on a detection of (1) an access to a coil access portal of the AC system using an AC portal magnetic door sensor; (2) the access to the coil access portal being in an appropriate range of time for coil maintenance to have been performed; and (3) a detected improvement in coil performance (e.g., greater than a threshold or percentage improvement). FIG. 22 depicts example heat exchange data captured and stored for a coil over time.

A goal of an AC system is to provide quality air to a volume whose air is being controlled. But to troubleshoot AC issues, it is important to monitor air quality at an input or inside of the AC system to identify a location of faults or areas for performance improvement. FIG. 23 is a flow diagram depicting a method of measuring air quality and making corresponding predictions inside of an AC system. Sensor data is captured at 2302 using one or more sensors that are installed at an AC air input or within an AC system. The sensor data is transmitted to an AC analysis server for storage and analysis at 2304. Evaluations of the current and predicted air quality states are made, with alerts and graphical user interface updates being provided based on those analyses at 2306. For example, an AC analysis server may be configured to provide alerts to a user if the air quality is deemed dirty based on particulate matter, carbon dioxide, carbon monoxide, volatile concentrations, trends, etc. In one example, artificial intelligence recognizes patterns in air quality-relevant sensor data (e.g., which types of data are predictive, relative importance of sensor data types) prior to an alert being distributed for air quality concerns, providing a time estimate on when air quality action should be taken. Particulate matter can be measured using a variety of metrics including counts of particulate matter of different sizes per volume.

Figure 24:
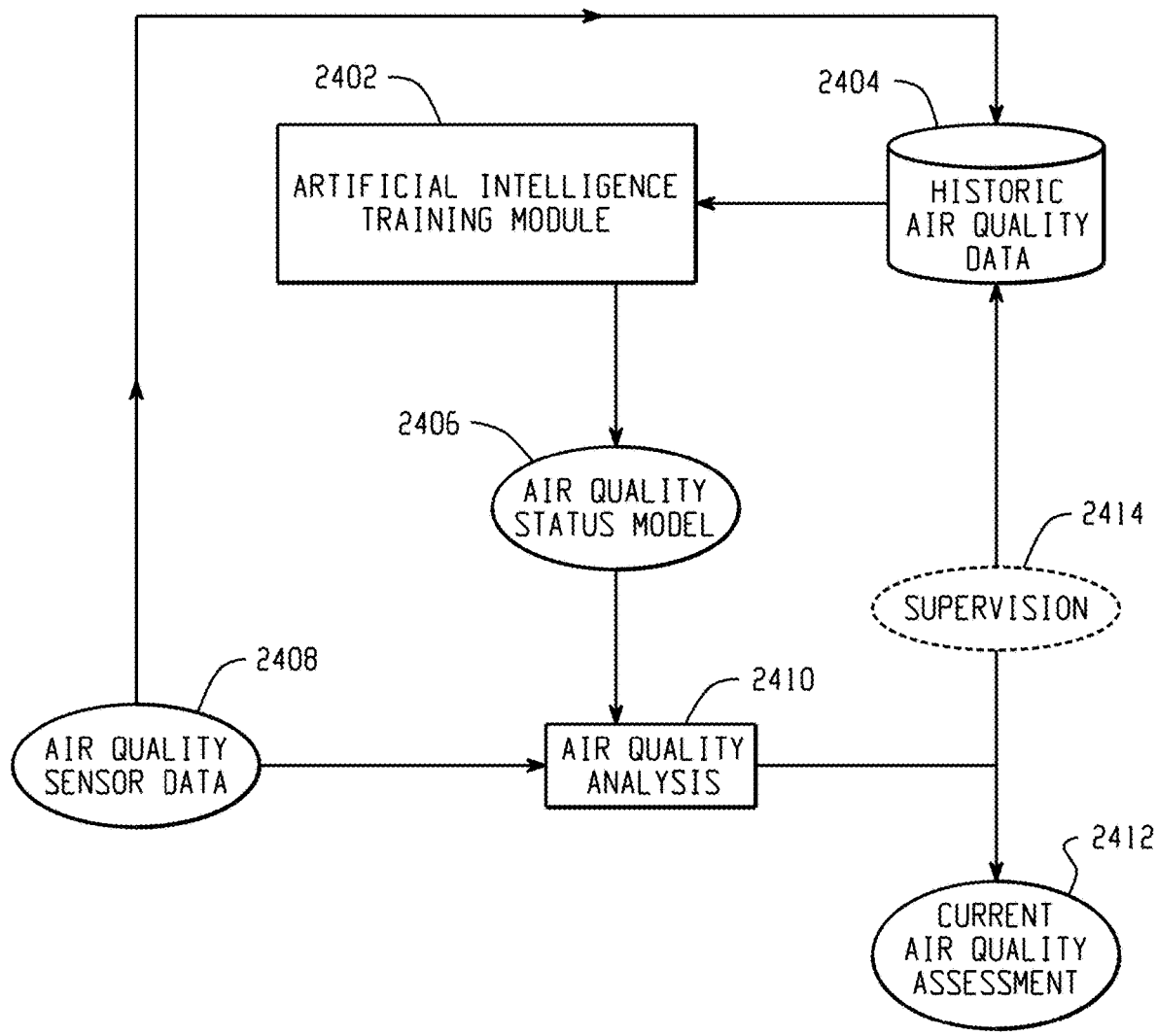
FIG. 24 is a flow diagram depicting an artificial intelligence training module training an air quality model.

FIG. 24 is a flow diagram depicting an artificial intelligence training module training an air quality model. An artificial intelligence training module 2402 receives historic air quality relevant data 2404 from the current AC system and/or other AC systems that has been captured over time. Based on that data and associated estimated or predicted metrics (e.g., current air quality status, estimated time to unsatisfactory air quality, actual time to unsatisfactory air quality after data capture), an air quality analysis model 2406 (e.g., a neural network) is trained to provide those estimated or predicted metrics based on current image, sensor, and or other data 2408 and trends via an air quality analysis module 2410. The air quality assessment 2412 determined using the air quality model 2406 is output from the analysis for display on a user interface or issuance of an alert. The determined air quality assessment 2412 along with the image/sensor data 2408 that resulted in that determined air quality assessment 2412 may be stored at 2404 and feedback to the training module 2402 in an unsupervised or supervised fashion 2414 to further train the model 2406.

Figure 26:
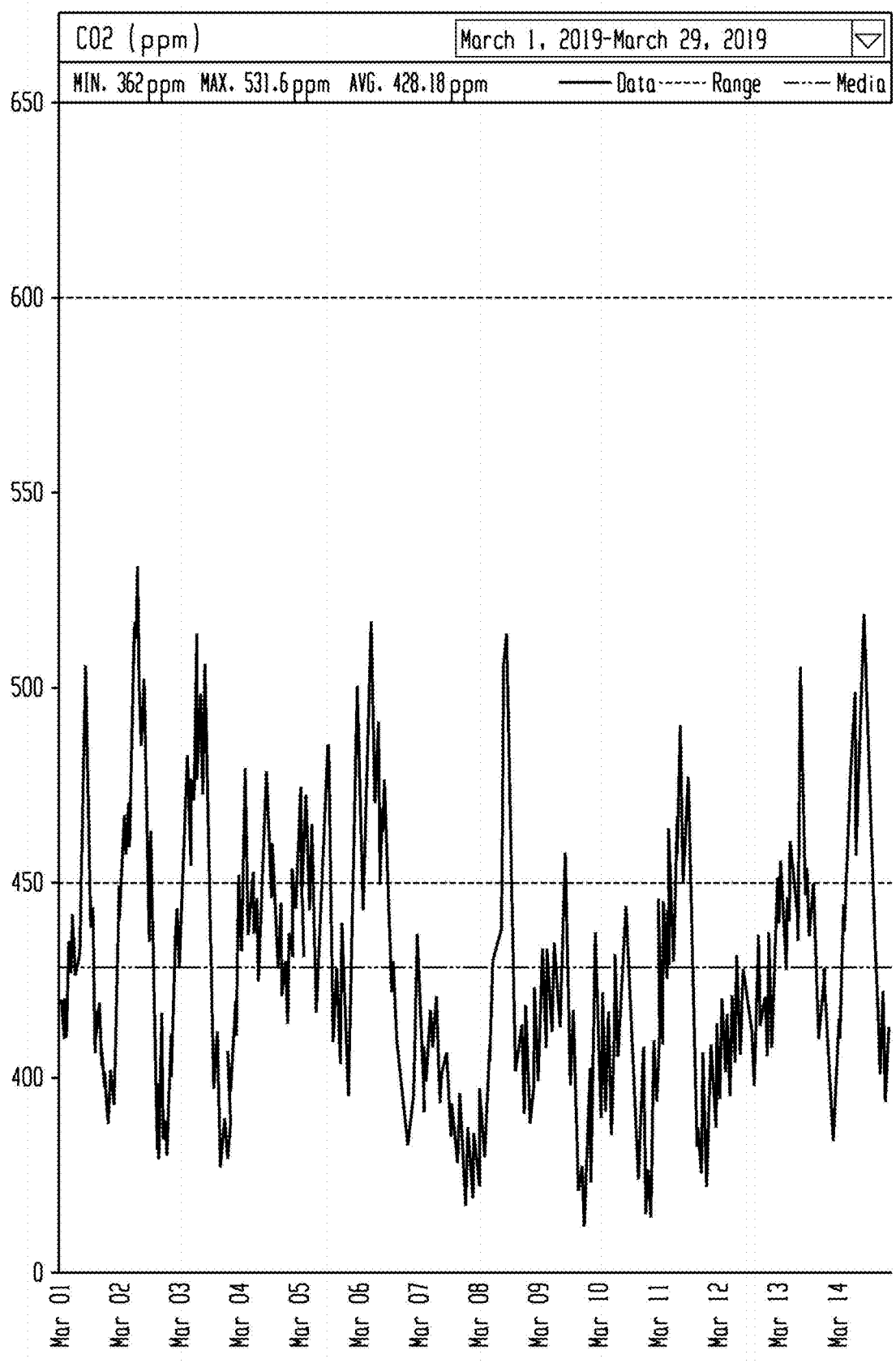
FIG. 26 depicts example carbon dioxide data captured and stored over time.

FIG. 25 depicts a user interface providing indications of air quality at various points within an AC system. The top four sections of the user interface provide different measurements of particulates detected in the air at an AC system's air intake. Corresponding qualitative assessments and suggested corrective actions (e.g., changing a filter to improve quality, monitoring air return rations) are provided. A bottom two sections of the user interface illustrate carbon dioxide measurements at other points within the air conditioning systems and corresponding qualitative assessments and suggested actions. FIG. 26 depicts example carbon dioxide data captured and stored over time. FIG. 27 depicts example particulate weight and count data captured and stored over a period of time.

AC systems may also incorporate tools for sanitation or otherwise treating air. For example, ultraviolet (UV) light may be introduced into an AC system for antimicrobial purposes. In other instances, disinfectant mists and fragrances may be introduced into AC system air for desired effects. Operation and status of such sanitation systems may be monitored. For example, the sanitation equipment may generate and send operation data providing information on current status, amount of chemicals introduced, power supply data directly to an AC analysis server. In certain implementations, operation of sanitation equipment may be indirectly measured using other sensors. For example, camera or light detection sensors may be used to observe amounts of UV light output by sanitation equipment. Such detection can inform the analysis system regarding whether the sanitation equipment is operating (i.e., the UV light is on or off) and its effectiveness (e.g., whether the UV light needs to be cleaned based on a detected light level magnitude). Whether and how well chemical introducing sanitation equipment is functioning can similarly be ascertained using chemical sensors or cameras that can detect sprays of chemicals.

Figure 28:
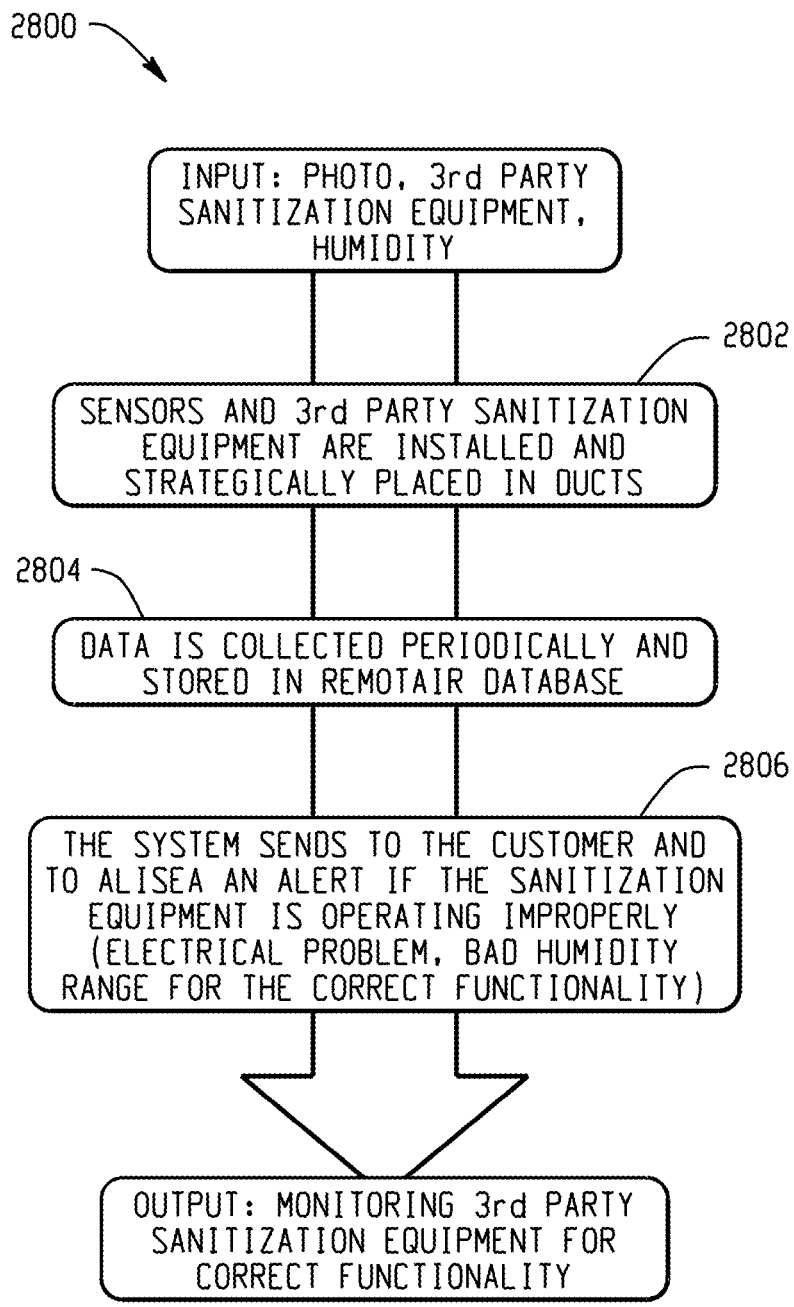
FIG. 28 is a flow diagram depicting a method of measuring sanitation equipment function and making corresponding predictions.

FIG. 28 is a flow diagram depicting a method of measuring sanitation equipment function and making corresponding predictions. Sensor data is captured at 2802 using one or more sensors that are installed at an AC air input or within an AC system. The sensor data is transmitted to an AC analysis server for storage and analysis at 2804. Evaluations of the current and predicted sanitation equipment states are made, with alerts and graphical user interface updates being provided based on those analyses at 2806. For example, an AC analysis server may be configured to provide alerts to a user if the sanitation equipment is operating improperly or predicted to operate improperly, such as based on electrical problems, humidity range outside of functional range of sanitation equipment, etc.

Figure 29:
FIG. 29 depicts graphical user interfaces associated with an ultraviolet light sanitation equipment.

FIG. 29 depicts graphical user interfaces associated with an ultraviolet light sanitation equipment. A first portion of the user interface indicates an amount of time the light has been detected to be in operation (e.g., based on captured image data), whether the detected humidity at or near the light is proper, and whether the light is being properly controlled. A qualitative assessment of the sanitation equipment is provided along with a suggested action and a prediction regarding when the sanitation equipment should be serviced (e.g., using an artificial intelligence neural network.) A bottom portion of the user interface depicts captured images of the sanitation equipment from which operation data can be derived. For example, pixel brightness can be used to detect whether the UV light is operating at a correct intensity, and a count of pixels indicating light emanating (e.g., light blue pixels) can be used to detect dust contamination of the light.

As noted above, systems and methods as described herein can disclose automated detection of access to an AC system and maintenance thereon. FIG. 30 is a flow diagram depicting an example method of detecting access to an AC system. By monitoring sensor data, such as magnetic door/portal access sensors that sense when a door/portal is opened, differential pressure sensors indicating a drop in pressure associated with a door/portal being opened, timers, and other AC sensors detecting improved system performance after maintenance, occurrence of accesses to an AC system generally, a particular point in an AC system, and performance of maintenance can be detected. Such detection can be useful in tracking when and whether routine or alert-prompted maintenance is performed and detection of when and where unscheduled/unauthorized maintenance was made to detect possible nefarious activity and identify a corresponding location for remediation.

FIG. 30 is a flow diagram depicting a method of detecting AC system access and maintenance. Sensor data is captured at 3002 using one or more sensors that are installed at an AC air input or within an AC system. The sensor data is transmitted to an AC analysis server for storage and analysis at 3004. Evaluations of system accesses and whether maintenance was performed are made, with alerts and graphical user interface updates being provided based on those analyses at 3006. For example, an AC analysis server may be configured to provide alerts to a user if unexpected access to the system occurs, when expected maintenance is more than a threshold period past due, etc.

FIG. 31 depicts example user interfaces whereby automated maintenance detection is tracked against a maintenance schedule. Such user interfaces can be used to track compliance with maintenance protocols. When maintenance is detected, an indicator (e.g., a green circle) is added to the interface. In one example, maintenance is deemed detected when one or more of: (1) an AC system access sensor (e.g., magnetic door sensor, differential pressure system) indicates a system change indicative of access to the AC system, (2) the sensor indicates an access time appropriate for maintenance of the associated area of the AC system (e.g., not less than a first threshold amount of time, not more than a second threshold of time), and (3) a corresponding AC system performance improvement (e.g., lowered differential pressure at a filter) is observed. Failures to meet one or more of these criteria could be indicative of unauthorized access, lacking maintenance (e.g., opening a portal but not actually performing the work), or other anomaly (e.g., a stowaway in the AC system).

Figure 32:
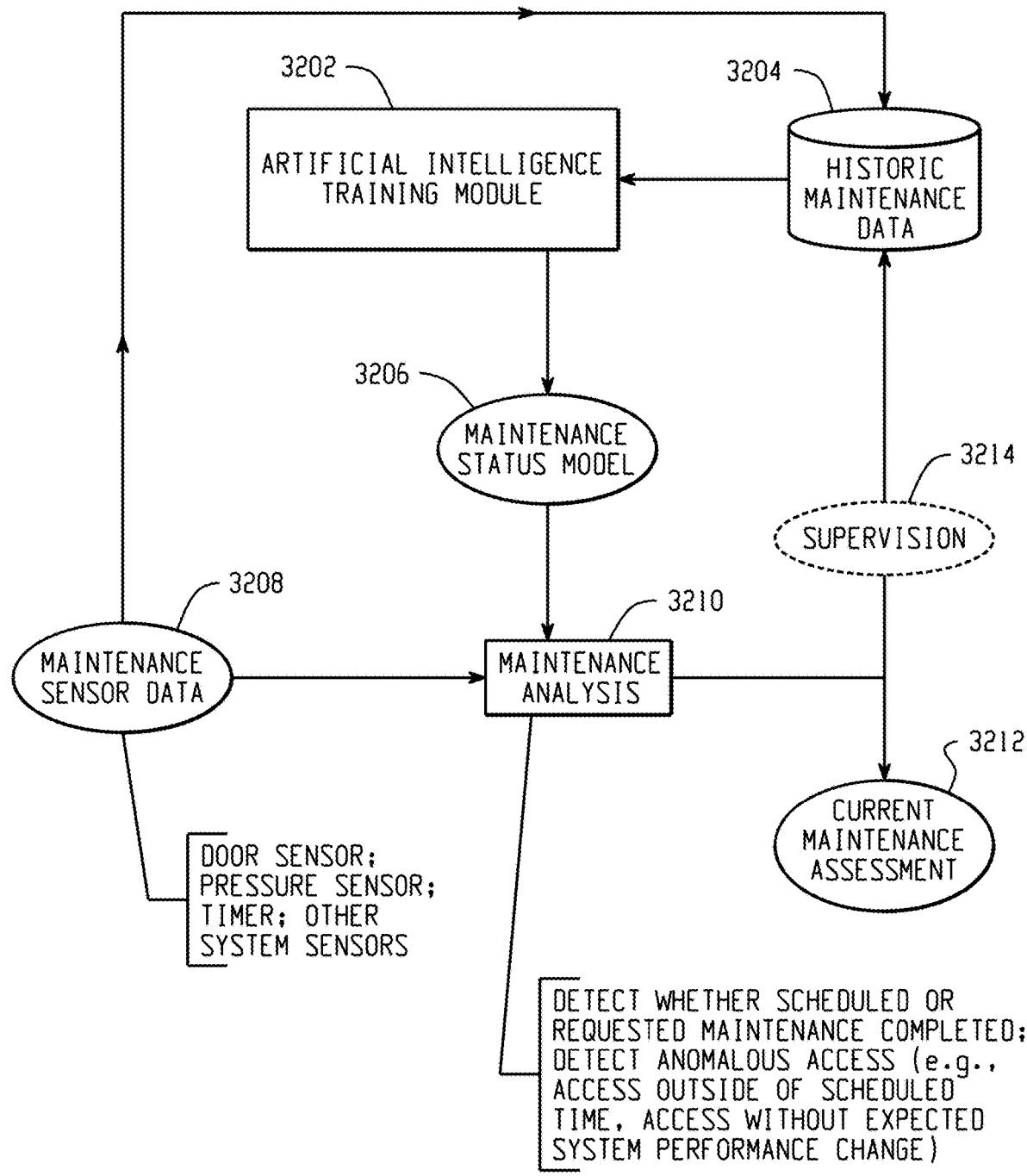
FIG. 32 is a flow diagram depicting an artificial intelligence training module training a maintenance status model.

FIG. 32 is a flow diagram depicting an artificial intelligence training module training a maintenance status model. An artificial intelligence training module 3202 receives historic maintenance relevant data 3204 from the current AC system and/or other AC systems that has been captured over time. Based on that data and associated estimated or predicted metrics (e.g., whether maintenance actually was performed, whether an AC system access corresponding to the data actual was deemed anomalous or possibly nefarious), a maintenance analysis model 3206 (e.g., a neural network) is trained to provide those estimated or predicted metrics based on current image, sensor, and or other data 3208 and trends via a maintenance analysis module 3210. The maintenance assessment 3212 determined using the maintenance status model 3206 is output from the analysis for display on a user interface or issuance of an alert. For example, an alert and corresponding location may be transmitted based on detection of an anomalous or possibly nefarious AC system access. The determined maintenance assessment 3212 along with the image/sensor data 3208 that resulted in that determined maintenance assessment 3212 may be stored at 3204 and feedback to the training module 3202 in an unsupervised or supervised fashion 3214 to further train the model 3206.

Figure 33:
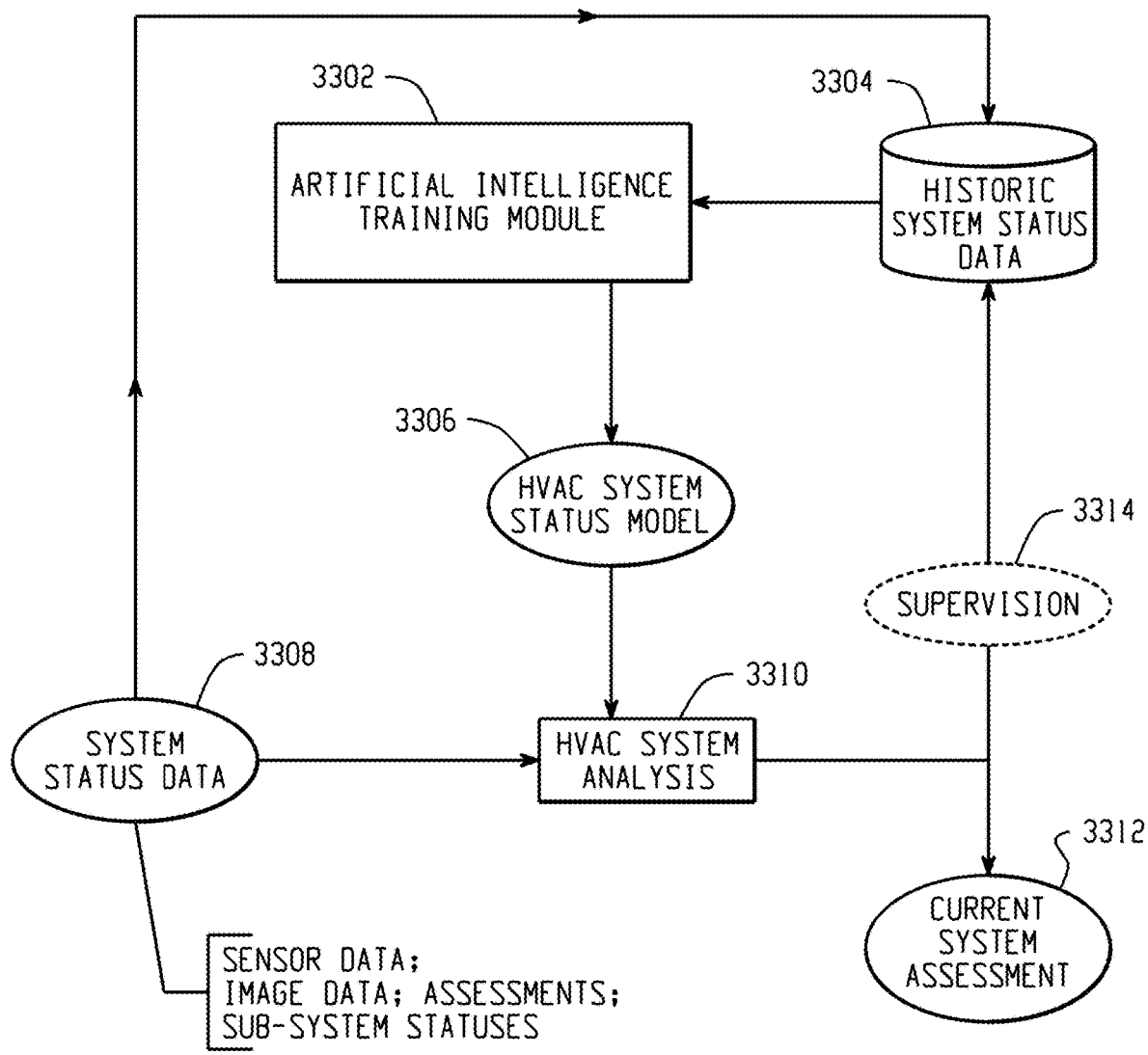
FIG. 33 is a flow diagram depicting an artificial intelligence training module training an HVAC system status model.

In addition to providing data regarding functionality of individual aspects of an AC system's performance, an AC analysis server can be configured to provide current and predictive assessments regarding the overall performance of an AC system, such as based on data and alerts discussed herein above. FIG. 33 is a flow diagram depicting an artificial intelligence training module training an HVAC system status model. An artificial intelligence training module 3302 receives historic HVAC system data 3304 from the current AC system and/or other AC systems that has been captured over time. Based on that data and associated estimated or predicted metrics (e.g., whether a system was deemed to need attention or maintenance), an HVAC system status model 3306 (e.g., a neural network) is trained to provide those estimated or predicted metrics based on current image, sensor, and or other data 3308 and trends via a HVAC system analysis module 3310. The HVAC status assessment 3312 determined using the HVAC system status model 3306 is output from the analysis for display on a user interface or issuance of an alert. The determined HVAC system status assessment 3312 along with the image/sensor data 3308 that resulted in that determined HVAC system status assessment 3312 may be stored at 3304 and feedback to the training module 3302 in an unsupervised or supervised fashion 3314 to further train the model 3306.

Figure 34:
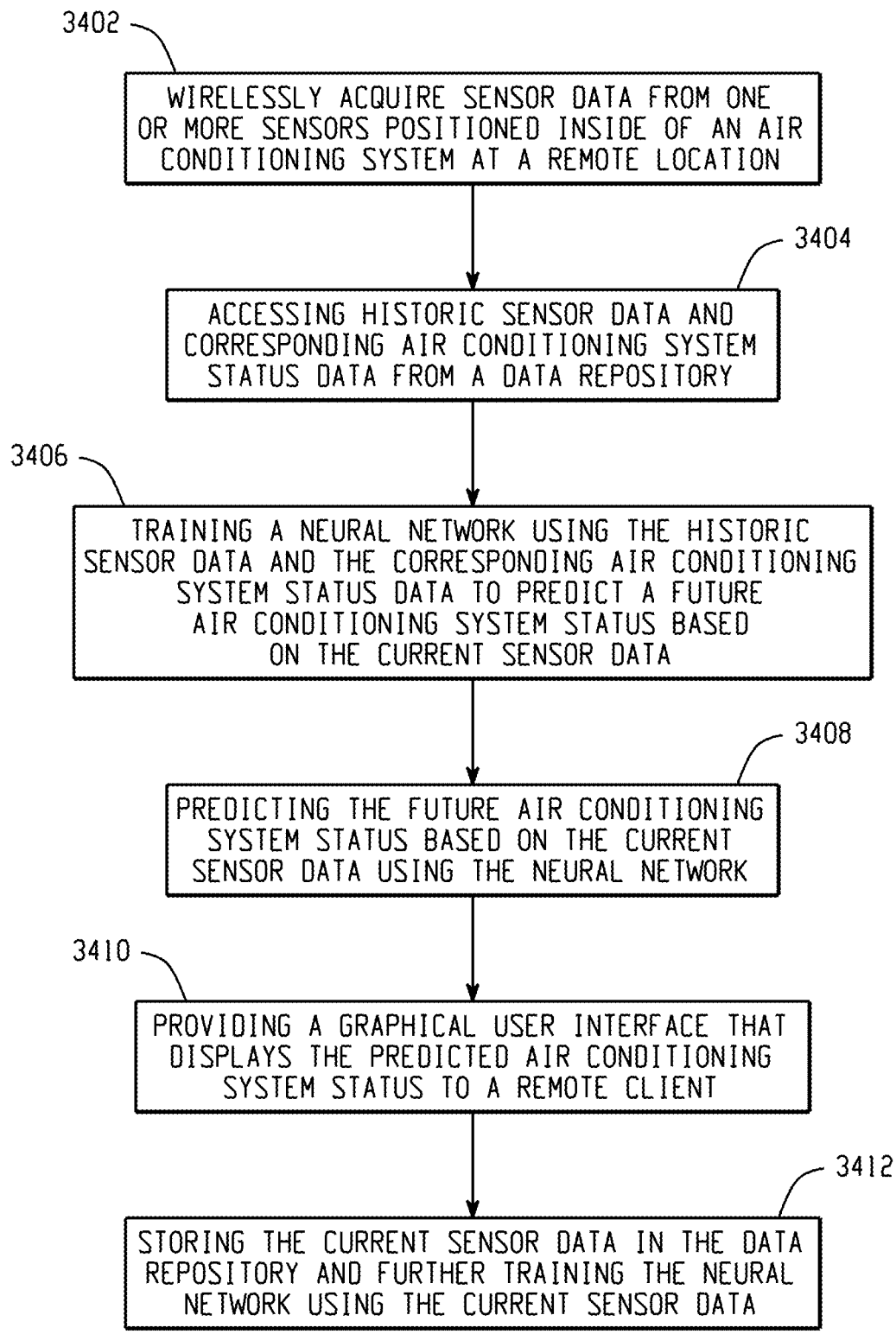
FIG. 34 is a flow diagram depicting a processor-implemented method for maintaining an air conditioning system.

FIG. 34 is a flow diagram depicting a processor-implemented method for maintaining an air conditioning system. A system can include one or more sensors positioned inside of the air conditioning system configured to wirelessly transmit current sensor data to a remote location that is received at 3402. A data repository contains historic sensor data and corresponding air conditioning system status data. That data is accessed at 3404 A neural network is trained at 3406 using the historic sensor data and the corresponding air conditioning system status data to predict a future air conditioning system status based on the wirelessly transmitted current sensor data. A server computer system is configured to predict the future air conditioning system status at 3408 based on the current sensor data using the neural network, and a graphical user interface is configured to display the predicted future air conditioning system status to a remote client at 3410. The current sensor data is stored at 3412 in the data repository and the neural network is further trained based on the current sensor data. In embodiments, data is transmitted via wireless connections, wired connections, or a combination of both.

Figure 35:
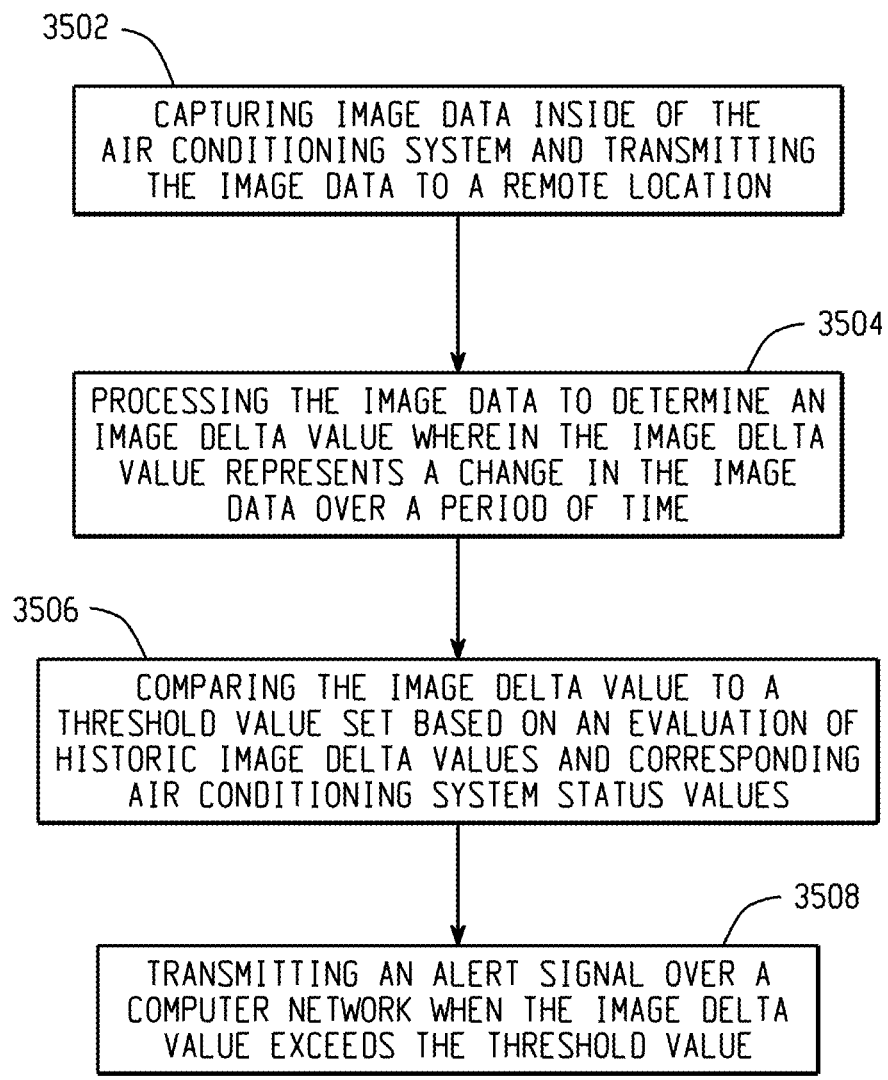
FIG. 35 is a flow diagram depicting a method for maintaining an air conditioning system.

FIG. 35 is a flow diagram depicting a method for maintaining an air conditioning system that includes capturing image data inside of the air conditioning system and transmitting the image data to a remote location outside of the air conditioning system at 3502. The image data is processed at the remote location to determine an image delta value at 3504, wherein the image delta value represents a change in the image data over a period of time. The image delta value is compared to a threshold value at 3506, wherein the threshold value is set based on an evaluation of historic image delta values and corresponding air conditioning system status values. An alert signal is transmitted at 3508 over a computer network when the image delta value exceeds the threshold value.

Figure 36A:
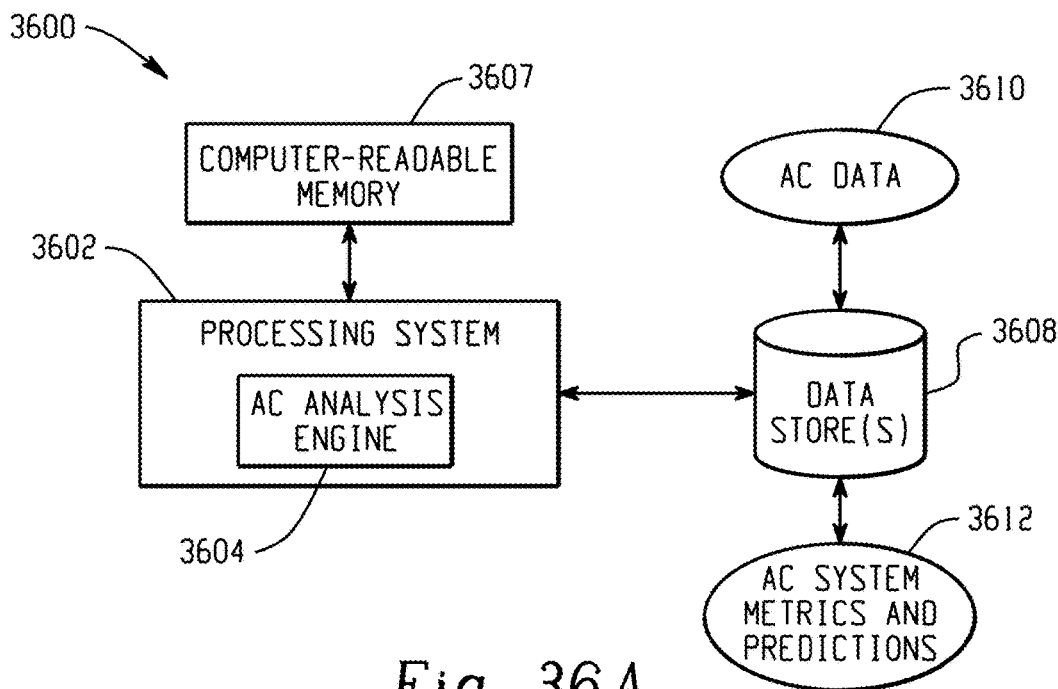
FIGS. 36A, 36B, and 36C depict example systems for implementing the approaches described herein for maintaining an air conditioning system.
Figure 36B:
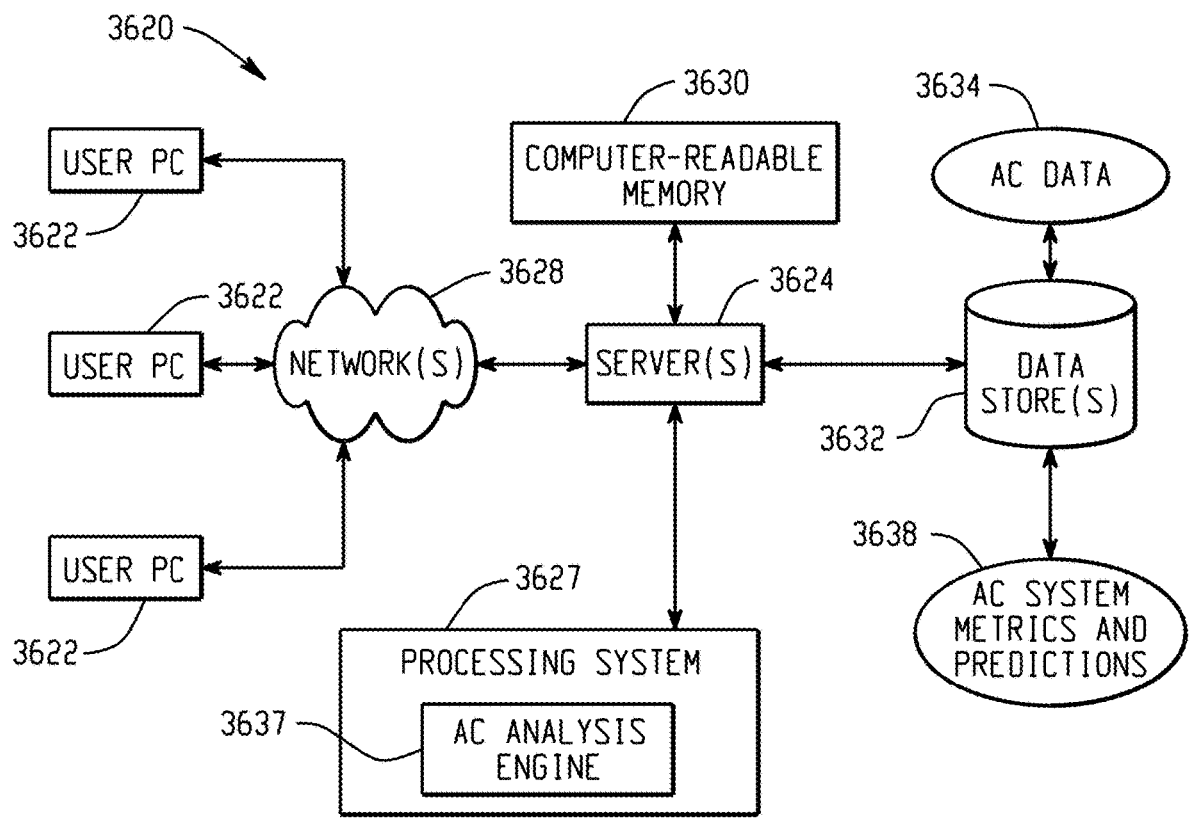
Figure 36C:
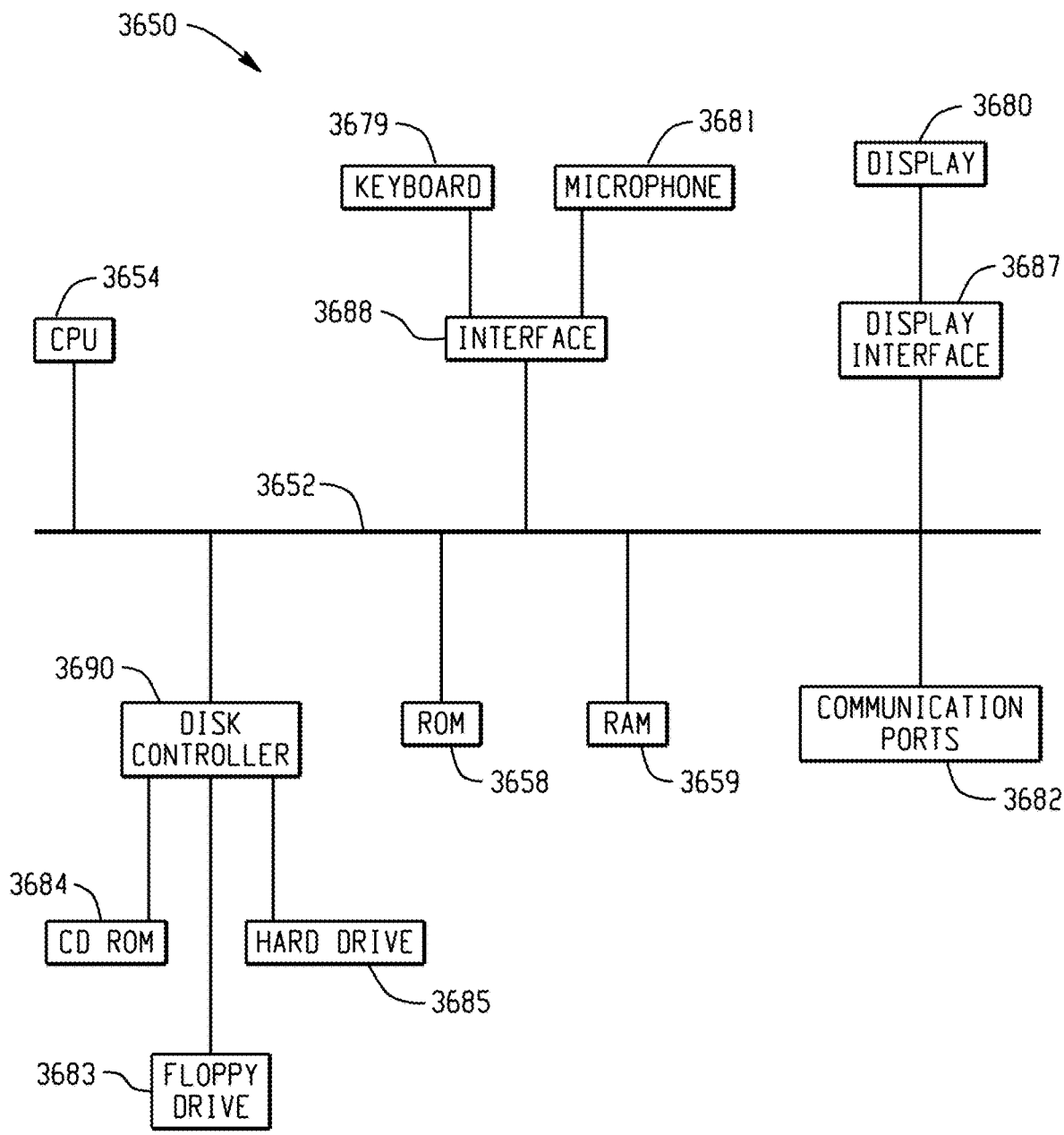

FIGS. 36A, 36B, and 36C depict example systems for implementing the approaches described herein for maintaining an air conditioning system. For example, FIG. 36A depicts an exemplary system 3600 that includes a standalone computer architecture where a processing system 3602 (e.g., one or more computer processors located in a given computer or in multiple computers that may be separate and distinct from one another) includes a computer-implemented AC analysis engine 3604 being executed on the processing system 3602. The processing system 3602 has access to a computer-readable memory 3607 in addition to one or more data stores 3608. The one or more data stores 3608 may include an AC data database 3610 as well as a AC system metrics and predictions database 3612. The processing system 3602 may be a distributed parallel computing environment, which may be used to handle very large-scale data sets.

FIG. 36B depicts a system 3620 that includes a client-server architecture. One or more user PCs 3622 access one or more servers 3624 running an AC analysis engine engine 3637 on a processing system 3627 via one or more networks 3628. The one or more servers 3624 may access a computer-readable memory 3630 as well as one or more data stores 3632. The one or more data stores 3632 may include an AC data database 3634 as well as an AC system metrics and predictions database 3638.

FIG. 36C shows a block diagram of exemplary hardware for a standalone computer architecture 3650, such as the architecture depicted in FIG. 36A that may be used to include and/or implement the program instructions of system embodiments of the present disclosure. A bus 3652 may serve as the information highway interconnecting the other illustrated components of the hardware. A processing system 3654 labeled CPU (central processing unit) (e.g., one or more computer processors at a given computer or at multiple computers), may perform calculations and logic operations required to execute a program. A non-transitory processor-readable storage medium, such as read only memory (ROM) 3658 and random access memory (RAM) 36536, may be in communication with the processing system 3654 and may include one or more programming instructions for performing the method of maintaining an air conditioning system. Optionally, program instructions may be stored on a non-transitory computer-readable storage medium such as a magnetic disk, optical disk, recordable memory device, flash memory, or other physical storage medium.

In FIGS. 36A, 36B, and 36C, computer readable memories 3607, 3630, 3658, 3659 or data stores 3608, 3632, 3683, 3684, 3688 may include one or more data structures for storing and associating various data used in the example systems for maintaining an air conditioning system. For example, a data structure stored in any of the aforementioned locations may be used to store data from XML files, initial parameters, and/or data for other variables described herein. A disk controller 3690 interfaces one or more optional disk drives to the system bus 3652. These disk drives may be external or internal floppy disk drives such as 3683, external or internal CD-ROM, CD-R, CD-RW or DVD drives such as 3684, or external or internal hard drives 3685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 3690, the ROM 3658 and/or the RAM 3659. The processor 3654 may access one or more components as required.

A display interface 3687 may permit information from the bus 3652 to be displayed on a display 3680 in audio, graphic, or alphanumeric format. Communication with external devices may optionally occur using various communication ports 3682.

In addition to these computer-type components, the hardware may also include data input devices, such as a keyboard 3679, or other input device 3681, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

Further advantageous embodiments will be described with the help of the following examples:

1. A computer-implemented system for maintaining an air conditioning system, comprising:
   one or more sensors positioned inside of the air conditioning system configured to transmit current sensor data to a remote location;
   a data repository containing historic sensor data and corresponding air conditioning system status data;
   a neural network trained using the historic sensor data and the corresponding air conditioning system status data to predict a future air conditioning system status based on the transmitted current sensor data;
   a server computer system configured to predict the future air conditioning system status based on the current sensor data using the neural network; and
   a graphical user interface configured to display the predicted future air conditioning system status to a remote client;
   wherein the current sensor data is stored in the data repository and the neural network is further trained based on the current sensor data.

2. The system of example 1, wherein the user interface is configured to display a current or future maintenance alert for the air conditioning system based on a plurality of:
   an air handling unit cleanliness metric;
   a duct cleanliness metric;
   a microbiological contaminant status;
   a filter status;
   a coil status;
   an internal air conditioning system air quality status;
   a sanitation system status; and
   an air conditioning system maintenance status.

3. A computer-implemented method for maintaining an air conditioning system, comprising:
   capturing image data inside of the air conditioning system and transmitting the image data to a remote location outside of the air conditioning system;
   processing the image data at the remote location to determine an image delta value, wherein the image delta value represents a change in the image data over a period of time;
   comparing the image delta value to a threshold value, wherein the threshold value is set based on an evaluation of historic image delta values;
   transmitting an alert signal over a computer network when the image delta value exceeds the threshold value.

4. The method of one of the preceding examples, wherein the alert signal indicates that maintenance is to be performed on the air conditioning system based on a degradation of a condition at the air conditioning system.

5. The method of one of the preceding examples, wherein the alert is transmitted to a maintenance staff computer system.

6. The method of one of the preceding examples, wherein comparing the image delta value to a threshold value comprises converting the image delta value to a dust level value and comparing the dust level value to the threshold value.

7. The method of example 6, wherein the dust level value is measured in (mass or weight) per unit area.

8. The method of one of the preceding examples, wherein the image delta value is determined by comparing a pixel value of the image data to a pixel value of a baseline image, wherein the image delta value represents a difference in pixel value from the baseline image.

9. The method of example 8, wherein the pixel values are pixel color values.

10. The method of one of the preceding examples, wherein the image data comprises an image of a reference object in the air conditioning system, wherein the baseline image is acquired at installation of the reference object or upon a cleaning of the air conditioning system that includes a cleaning of the reference object.

11. The method of example 10, wherein the reference object is a flat object comprising sections of different objects.

12. The method of example 10 or 11, wherein the reference object is a sticker or decal.

13. The method of one of the preceding examples, wherein the image delta value is calculated as a contamination weight according to:

$$\text{Weight} = m * \text{average\_value} + q$$

where Weight is the contamination weight, m is a constant value, average_value is a pixel value associated with a the image data, and q is a normalization value, wherein the q normalization value is set based on a pixel value associated with an initial image according to:

$$q = -m * \text{average\_value\_min}.$$

14. The method of one of the preceding examples, wherein the image data is captured using a digital camera at or near an air handling unit or duct of the air conditioning system, wherein the image data is wirelessly transmitted to a remote server.

15. The method of one of the preceding examples, wherein the threshold value is determined using a neural network, wherein the neural network is trained using the historic images and collected data.

16. The method of example 15, wherein the threshold value is further determined by the neural network using corresponding qualitative assessments of air conditioning systems.

17. The method of one of the preceding examples, further comprising providing a user interface that identifies a current air conditioning system status based on the image delta value and a predictive analysis status based on the image delta value,
wherein the predictive analysis status identifies an anticipated time until degradation of the air conditioning system that will require service using the neural network.

18. The method of one of the preceding examples, further comprising:
capturing temperature data and humidity data that is transmitted to the remote location;
determining a microbiological contamination risk level based on the image data, the temperature data, and the humidity data;
wherein a microbiological alert is transmitted when the microbiological contamination risk level exceeds a microbiological threshold.

19. The method of one of the preceding examples, further comprising:
providing a predictive analysis for microbiological contamination risk level using a neural network trained using historical temperature data, humidity data, image data, and corresponding microbiological contamination risk level data;
wherein the predictive analysis for microbiological identifies whether the air conditioning system currently is at risk for microbiological contamination and a time until likely microbiological contamination under current conditions.

20. The method of example 18 or 19, wherein the microbiological risk level threshold is set using historic data and a neural network or a characteristic of an air conditioning system being monitored.

21. The method of one of the preceding examples, further comprising:
capturing differential air pressure data indicating a difference in air pressure before and after a component in the air conditioning system that is transmitted to the remote location;
determining a status of the component based on the differential air pressure data;
wherein a component status alert is transmitted when the differential air pressure exceeds a differential air pressure threshold.

22. The method of example 21, further comprising:
providing a predictive analysis for status of the component using a neural network trained using historical differential air pressure data and corresponding component status data;
wherein the predictive analysis for status of the component identifies whether the component is currently compromised and a time until the component is likely to enter a compromised status.

23. The method of example 21 or 22, wherein the differential air pressure threshold is set using historic data and a neural network.

24. The method of one of the examples claims 21 to 23, wherein the component is a filter in the air conditioning system.

25. The method of one of the examples 21 to 24, wherein the component is an air condition system coil, wherein the method further comprises:
capturing enthalpy data associated with the component that is transmitted to the remote location;
wherein the status of the coil is determined based on the differential air pressure and the enthalpy data.

26. The method of example 25, further comprising:
providing a predictive analysis for status of the coil using a neural network trained using historical differential air pressure data, historical enthalpy data, and corresponding coil status data;
wherein the predictive analysis for status of the coil identifies whether the coil is currently compromised and a time until the coil is likely to enter a compromised status.

27. The method of one of the preceding examples, further comprising:
capturing air quality data indicating a particulate matter count or concentration of a substance at an intake of the air condition system or inside the air conditioning system that is transmitted to the remote location;
determining an internal air quality status based on the air quality data;
wherein an air quality alert is transmitted when the air quality status surpasses a threshold.

28. The method of example 27, wherein the air quality data comprises a particulate matter count, a carbon dioxide concentration, a carbon monoxide concentration, or a volatile matter count.

29. The method of one of the preceding examples, further comprising:
providing a predictive analysis for air quality status within the air conditioning system using a neural network trained using historical air quality data and corresponding air quality status data;

wherein the predictive analysis for air quality status identifies whether air quality is currently compromised and a time until the air quality is likely to enter a compromised status.

30. The method of one of the preceding examples, further comprising monitoring status of sanitation equipment in the air conditioning system, wherein the sanitation equipment introduces a substance into the air conditioning system or treats air in the air conditioning system using ultraviolet light;
wherein the status of the sanitation equipment is monitored based on the image data;
wherein a sanitation equipment alert is transmitted when the sanitation equipment is determined to be malfunctioning or functioning suboptimally based on the image data.

31. The method of example 30, wherein the sanitation equipment is an ultraviolet light, wherein status of the sanitation equipment is determined based on a light intensity value determined based on the image data.

32. The method of one of the preceding examples, further comprising capturing air conditioning system access data that is transmitted to the remote location;
determining whether maintenance was performed on the air conditioning system based on the system access data;
wherein maintenance status data is provided on a user interface based on the determination of whether maintenance was performed.

33. The method of example 32, wherein the determination of whether maintenance was performed is based on an amount of time that the air conditioning system was accessed based on a sensor responsive to an access portal of the air conditioning system.

34. The method of example 32 or 33, wherein the determination of whether maintenance was performed is additionally based on a change in a system status parameter that indicates improved performance of the air conditioning system after the air conditioning system was accessed.

35. The method of one of the examples 32 to 34, further comprising determining whether access to the air conditioning system corresponds with scheduled maintenance or maintenance initiated by an alert signal;
wherein the access corresponding with the scheduled maintenance of the maintenance initiated by the alert signal is indicated on the user interface.

36. The method of one of the examples 32 to 35, further comprising:
determining whether an access to the air conditioning system was an anomalous access based on one or more of:
the access being outside of an expected maintenance period;
the access being for a period of time less than or greater than an amount of expected time to perform the maintenance;
the access not having a corresponding improvement in a performance metric of the air conditioning system; and
providing an alert to the remote location when the access is determined to be an anomalous access.

37. The method of one of the preceding examples, wherein the air conditioning system is a heating system, a cooling system, or a heating, ventilation, and air conditioning (HVAC) system.

38. The method of one of the preceding examples, wherein image data is captured and transmitted to the remote locations multiple times each day.

39. A computer-implemented system for maintaining an air conditioning system, comprising:
one or more data processors;
a non-transitory computer-readable medium encoded with instructions for commanding a system to execute steps that include:
capturing image data inside of the air conditioning system and transmitting an image data to a remote location outside of the air conditioning system based on the captured image data;
processing the image data at the remote location to determine an image delta value, wherein the image delta value represents a change in the image data over a period of time;
comparing the image delta value to a threshold value, wherein the threshold value is set based on an evaluation of historic image delta values;
transmitting an alert signal over a computer network when the image delta value exceeds the threshold value.

40. A non-transitory computer-readable medium encoded with instructions for commanding a system to execute steps that include, comprising:
capturing image data inside of an air conditioning system and transmitting an image data to a remote location outside of the air conditioning system based on the captured image data;
processing the image data at the remote location to determine an image delta value, wherein the image delta value represents a change in the image data over a period of time;
comparing the image delta value to a threshold value, wherein the threshold value is set based on an evaluation of historic image delta values;
transmitting an alert signal over a computer network when the image delta value exceeds the threshold value.

It is claimed:

1. A computer-implemented method for monitoring the operation of an air conditioning system, comprising:
capturing an image comprising image data inside of the air conditioning system with an image capturing device, wherein the image capturing device is located in an air handling unit (AHU) or duct system;
transmitting the image data to a remote location outside of the air conditioning system;
processing the image data to calculate an image delta value, wherein the image delta value represents a change in the image data over a period of time;
comparing the image delta value to a threshold value, wherein the threshold value is set based on an evaluation of historic image delta values; and
transmitting an alert signal over a computer network when the image delta value exceeds the threshold value,
wherein
(i) the image delta value is determined by comparing a pixel value of the image data to a pixel value of a baseline image,
(a) wherein the pixel value for an image is calculated based on an average pixel value associated with a region of interest of the image,
(b) wherein the region of interest is a cropped portion of the image associated with a reference object within a region of interest of the air conditioning system, and (c) wherein the average pixel value is calculated by summing all pixel values of the pixels in the image and dividing by the number of pixels in the image; and/or (ii) the threshold value is determined using a neural network, wherein the neural network is trained using historic images and collected data and the method further comprises providing a user interface that identifies a current air conditioning system status based on the image delta value and a predictive status based on the image delta value, wherein the predictive analysis status identifies an anticipated time until degradation of the air conditioning system that will require service using the neural network.

2. The method of claim 1, wherein the alert signal indicates that maintenance is to be performed on the air conditioning system based on a degradation of a condition at the air conditioning system, wherein the alert is transmitted to a maintenance staff computer system.

3. The method of claim 1, wherein comparing the image delta value to a threshold value comprises converting the image delta value to a dust level value and comparing the dust level value to the threshold value.

4. The method of claim 1, wherein the pixel values are pixel color values.

5. The method of claim 1, wherein the image capture device is a digital camera.

6. The method of claim 1, further comprising:

capturing air quality data indicating a particulate matter count or concentration of a substance at an intake of the air condition system or inside the air conditioning system;

transmitting the air quality data to the remote location; and determining an internal air quality status based on the air quality data, wherein an air quality alert is transmitted when the air quality status surpasses a threshold, and wherein optionally the air quality data comprises one or more of a particulate matter count, a carbon dioxide concentration, a carbon monoxide concentration, or a volatile matter count.

7. The method of claim 1, wherein the method further comprises:

providing a predictive analysis for air quality status within the air conditioning system using a neural network trained using historical air quality data and corresponding air quality status data, wherein the predictive analysis for air quality status identifies whether air quality is currently compromised and a time until the air quality is likely to enter a compromised status.

8. The method of claim 1, wherein the method further comprises monitoring status of sanitation equipment in the air conditioning system, wherein the sanitation equipment introduces a substance into the air conditioning system or treats air in the air conditioning system using ultraviolet light, wherein the status of the sanitation equipment is monitored based on the image data, wherein a sanitation equipment alert is transmitted when the sanitation equipment is determined to be malfunctioning or functioning suboptimally based on the image data, and wherein status of the sanitation equipment is determined based on a light intensity value determined based on the image data.

9. The method of claim 1, wherein the air conditioning system is a heating system, a cooling system, or a heating, ventilation, and air conditioning (HVAC) system.

10. The method of claim 1, wherein the reference object is a sticker or decal.

11. The method of claim 1, wherein image data is captured and transmitted to the remote location multiple times each day.

12. The method of claim 1, wherein the image data comprises an image of a reference object in the air conditioning system, and wherein the baseline image is acquired at installation of the reference object or upon a cleaning of the air conditioning system that includes a cleaning of the reference object.

13. The method of claim 1, wherein the image delta value is calculated as a contamination weight according to:

$$weight = m * average\_value + q$$

wherein weight is the contamination weight, m is a constant value, average_value is a pixel value associated with the image data, and q is a normalization value, wherein the q normalization value is set based on a pixel value associated with an initial image according to:

$$q = -m * average\_value\_min,$$

wherein average_value_min is the average pixel value for the initial image.

14. The method of claim 1, wherein the threshold value is further determined by the neural network using corresponding qualitative assessments of air conditioning systems.

15. The method of claim 1, wherein the method further comprises:

capturing temperature data and humidity data;

transmitting the temperature data and humidity data to the remote location; and determining a microbiological contamination risk level based on the image data, the temperature data, and the humidity data, wherein a microbiological alert is transmitted when the microbiological contamination risk level exceeds a microbiological threshold, and wherein the microbiological risk level threshold is set using historic data and a neural network or a characteristic of an air conditioning system being monitored.

16. The method of claim 1, wherein the method further comprises providing a predictive analysis for microbiological contamination risk level using a neural network trained using historical temperature data, humidity data, image data, and corresponding microbiological contamination risk level data, and wherein the predictive analysis for microbiological identifies if the air conditioning system currently is at risk for microbiological contamination and a length of time until likely microbiological contamination under current conditions.

17. The method of claim 1, wherein the method further comprises:

capturing differential air pressure data indicating a difference in air pressure before and after a component in the air conditioning system;

transmitting the differential air pressure data to the remote location; and determining a status of the component based on the differential air pressure data, wherein a component status alert is transmitted when the differential air pressure exceeds a differential air pressure threshold.

18. The method of claim 1, wherein the method further comprises providing a predictive analysis for status of the component using a neural network trained using historical differential air pressure data and corresponding component status data, wherein the predictive analysis for status of the component identifies whether the component is currently compromised and a time until the component is likely to enter a compromised status, wherein
  (i) the differential air pressure threshold is set using historic data and a neural network,
  (ii) the component is a filter in the air conditioning system, and/or
  (iii) the component is an air condition system coil, wherein the method further comprises capturing enthalpy data associated with the component and transmitting the enthalpy data to the remote location, and wherein the status of the coil is determined based on the historical differential air pressure data and the enthalpy data.

19. The method of claim 1, wherein the method further comprises:
  (a) capturing air conditioning system access data;
  (b) transmitting the air conditioning system access data to the remote location; and
  (c) determining whether maintenance was performed on the air conditioning system based on the air conditioning system access data,
  wherein maintenance status data is provided on a user interface and based on the determination of whether maintenance was performed, and
  wherein
    (i) the determination of whether maintenance was performed is based on an amount of time that the air conditioning system was accessed based on a sensor responsive to an access portal of the air conditioning system, wherein optionally the determination of whether maintenance was performed is additionally based on a change in a system status parameter that indicates improved performance of the air conditioning system after the air conditioning system was accessed, or
    (ii) the method further comprises determining whether an access to the air conditioning system corresponds with scheduled maintenance or maintenance initiated by an alert signal, wherein the access corresponding with the scheduled maintenance of the maintenance initiated by the alert signal is indicated on the user interface, or
    (iii) the method further comprises
      a) determining whether an access to the air conditioning system was an anomalous access based on one or more of:
        the access being outside of an expected maintenance period;
        the access being for a period of time less than or greater than an amount of expected time to perform the maintenance; and
        the access not having a corresponding improvement in a performance metric of the air conditioning system; and
      b) providing an alert to the remote location when the access is determined to be an anomalous access.

20. A computer-implemented method for monitoring the operation of an air conditioning system, comprising:
  capturing image data inside of the air conditioning system;
  processing the image data to determine an image delta value, wherein the image delta value represents a change in the image data over a period of time;
  comparing the image delta value to a threshold value; and
  transmitting an alert signal over a computer network when the image delta value exceeds the threshold value,
  wherein the image delta value is determined by comparing a pixel value of the image data to a pixel value of a baseline image, and
  wherein the image delta value is calculated as a contamination weight according to:

$$\text{weight} = m * \text{average\_value} + q$$

wherein
    weight is the contamination weight,
    m is a constant value,
    average_value is a pixel value associated with the image data, and
    q is a normalization value, wherein the q normalization value is set based on a pixel value associated with an initial image according to:

$$q = -m * \text{average\_value\_min},$$

wherein average_value_min is the average pixel value for the initial image.

21. A computer-implemented method for monitoring the operation of an air conditioning system, comprising:
  capturing image data inside of the air conditioning system;
  processing the image data to determine an image delta value, wherein the image delta value represents a change in the image data over a period of time;
  comparing the image delta value to a threshold value;
  transmitting an alert signal over a computer network when the image delta value exceeds the threshold value,
  wherein the threshold value is determined using a neural network, wherein the neural network is trained using historic images and collected data,
  wherein
    a) the threshold value is further determined by the neural network using corresponding qualitative assessments of air conditioning systems, or
    b) the method further comprises providing a user interface that identifies a current air conditioning system status based on the image delta value and a predictive analysis status based on the image delta value, wherein the predictive analysis status identifies an anticipated time until degradation of the air conditioning system that will require service using the neural network.

22. The method of claim 21, wherein (iii) further comprises providing a predictive analysis for status of the coil using a neural network trained using historical differential air pressure data, historical enthalpy data, and corresponding coil status data, wherein the predictive analysis for status of the coil identifies whether the coil is currently compromised and a time until the coil is likely to enter a compromised status.

23. A computer-implemented method for monitoring the operation of an air conditioning system, comprising:
  capturing image data inside of the air conditioning system;
  processing the image data to determine an image delta value, wherein the image delta value represents a change in the image data over a period of time;

comparing the image delta value to a threshold value;
transmitting an alert signal over a computer network when the image delta value exceeds the threshold value,
wherein the method further comprises:
capturing temperature data and humidity data;
transmitting the temperature data and humidity data to the remote location outside of the air conditioning system; and
determining a microbiological contamination risk level based on the image data, the temperature data, and the humidity data,
wherein a microbiological alert is transmitted when the microbiological contamination risk level exceeds a microbiological threshold, and
wherein the microbiological risk level threshold is set using historic data and a neural network or a characteristic of an air conditioning system being monitored.

24. A computer-implemented method for monitoring the operation of an air conditioning system, comprising:
capturing image data inside of the air conditioning system;
processing the image data to determine an image delta value, wherein the image delta value represents a change in the image data over a period of time;
comparing the image delta value to a threshold value;
transmitting an alert signal over a computer network when the image delta value exceeds the threshold value,
wherein the method further comprises:
providing a predictive analysis for microbiological contamination risk level using a neural network trained using historical temperature data, humidity data, image data, and corresponding microbiological contamination risk level data,
wherein the predictive analysis for microbiological identifies if the air conditioning system currently is at risk for microbiological contamination and a length of time until likely microbiological contamination under current conditions.

25. A computer-implemented method for monitoring the operation of an air conditioning system, comprising:
capturing image data inside of the air conditioning system;
processing the image data to determine an image delta value, wherein the image delta value represents a change in the image data over a period of time;
comparing the image delta value to a threshold value;
transmitting an alert signal over a computer network when the image delta value exceeds the threshold value,
wherein the method further comprises:
capturing differential air pressure data indicating a difference in air pressure before and after a component in the air conditioning system;
transmitting the differential air pressure data to a remote location outside of the air conditioning system; and
determining a status of the component based on the differential air pressure data;
wherein a component status alert is transmitted when the differential air pressure exceeds a differential air pressure threshold, wherein:
(i) the method further comprises providing a predictive analysis for status of the component using a neural network trained using historical differential air pressure data and corresponding component status data, and wherein the predictive analysis for status of the component identifies whether the component is currently compromised and a time until the component is likely to enter a compromised status, (ii) the differential air pressure threshold is set using historic data and a neural network,
(iii) the component is a filter in the air conditioning system, and/or
(iv) the component is an air condition system coil, wherein the method further comprises capturing enthalpy data associated with the component and transmitting the enthalpy data to the remote location, and wherein the status of the coil is determined based on the differential air pressure and the enthalpy data.

26. The method of claim 25, wherein alternative (iv) further comprises:
providing a predictive analysis for status of the coil using a neural network trained using historical differential air pressure data, historical enthalpy data, and corresponding coil status data, wherein the predictive analysis for status of the coil identifies whether the coil is currently compromised and a time until the coil is likely to enter a compromised status.

27. A computer-implemented method for monitoring the operation of an air conditioning system, comprising:
capturing image data inside of the air conditioning system;
processing the image data to determine an image delta value, wherein the image delta value represents a change in the image data over a period of time;
comparing the image delta value to a threshold value;
transmitting an alert signal over a computer network when the image delta value exceeds the threshold value,
wherein the method further comprises:
capturing air conditioning system access data;
transmitting the air conditioning system access data to a remote location outside of the air conditioning system; and
determining whether maintenance was performed on the air conditioning system based on the system access data,
wherein maintenance status data is provided on a user interface and based on the determination of whether maintenance was performed, and wherein
(i) the determination of whether maintenance was performed is based on an amount of time that the air conditioning system was accessed based on a sensor responsive to an access portal of the air conditioning system, wherein optionally the determination of whether maintenance was performed is additionally based on a change in a system status parameter that indicates improved performance of the air conditioning system after the air conditioning system was accessed, or
(ii) the method further comprises determining whether an access to the air conditioning system corresponds with scheduled maintenance or maintenance initiated by an alert signal, wherein the access corresponding with the scheduled maintenance of the maintenance initiated by the alert signal is indicated on the user interface, or
(iii) the method further comprises:
determining whether an access to the air conditioning system was an anomalous access based on one or more of:
the access being outside of an expected maintenance period;
the access being for a period of time less than or greater than an amount of expected time to perform the maintenance;

the access not having a corresponding improvement in a performance metric of the air conditioning system; and providing an alert to the remote location when the access is determined to be an anomalous access.

28. A computer-implemented system for monitoring the operation of an air conditioning system, comprising:
one or more data processors; and
a non-transitory computer-readable medium encoded with instructions for commanding a system to execute steps that include:
capturing an image comprising image data inside of the air conditioning system with an image capture device, wherein the image capture device is in an air handling unit (AHU) or duct system; and
transmitting the image data to a remote location outside of the air conditioning system;
processing the image data to calculate an image delta value, wherein the image delta value represents a change in the image data over a period of time;
comparing the image delta value to a threshold value, wherein the threshold value is set based on an evaluation of historic image delta values;
transmitting an alert signal over a computer network when the image delta value exceeds the threshold value,
wherein
(i) the image delta value is determined by comparing a pixel value of the image data to a pixel value of a baseline image, and
 (a) wherein the pixel value for an image is calculated based on an average pixel value associated with a region of interest of the image,
 (b) wherein the region of interest is a cropped portion of the image associated with a reference object within a region of interest of the air conditioning system, wherein the average pixel value is calculated by summing all pixel values of the pixels in the image and dividing by the number of pixels in the image;
and/or
(ii) the threshold value is determined using a neural network,
 wherein the neural network is trained using historic images and collected data, and the method further comprises:
 providing a user interface that identified a current air conditioning system status based on the image delta value and a predictive analysis status based on the image delta value,
 wherein the predictive analysis status identifies an anticipated time until degradation of the air condition system that will require service using the neural network.

29. A non-transitory computer-readable medium encoded with instructions for commanding a system to execute steps that include:
capturing an image comprising image data inside of the air conditioning system with an image capture device, wherein the image capture device is in an air handling unit (AHU) or duct system; and
transmitting the image data to a remote location outside of the air conditioning system;
processing the image data at a remote location to calculate an image delta value, wherein the image delta value represents a change in the image data over a period of time;
comparing the image delta value to a threshold value, wherein the threshold value is set based on an evaluation of historic image delta values;
transmitting an alert signal over a computer network when the image delta value exceeds the threshold value,
wherein
(i) the image delta value is determined by comparing a pixel value of the image data to a pixel value of a baseline image,
 (a) wherein the pixel value for an image is calculated based on an average pixel value associated with a region of interest of the image,
 (b) wherein the region of interest is a cropped portion of the image associated with a reference object within a region of interest of the air conditioning system, wherein the average pixel value is calculated by summing all pixel values of the pixels in the image and dividing by the number of pixels in the image;
and/or
(ii) the threshold value is determined using a neural network,
 wherein the neural network is trained using historic images and collected data, and the method further comprises:
 providing a user interface that identified a current air conditioning system status based on the image delta value and a predictive analysis status based on the image delta value,
 wherein the predictive analysis status identifies an anticipated time until degradation of the air condition system that will require service using the neural network.

* * * * *